United States Patent
Ambrose et al.

(10) Patent No.: US 12,190,306 B2
(45) Date of Patent: Jan. 7, 2025

(54) INTEGRATION OF MULTI-USER INTERACTIONS USING DATA LINKAGE

(71) Applicant: Afterpay Limited, Melbourne (AU)

(72) Inventors: Jason Ambrose, Austin, TX (US); Jon Lagomarsino, San Francisco, CA (US); Melissa Parker Hughes, Sausalito, CA (US); Chloe Saintilan, New York, NY (US)

(73) Assignee: Afterpay Pty Ltd, Melbourne (AU)

( * ) Notice: Subject to any disclaimer, the term of this patent is extended or adjusted under 35 U.S.C. 154(b) by 0 days.

(21) Appl. No.: 17/884,874

(22) Filed: Aug. 10, 2022

(65) Prior Publication Data

US 2024/0054472 A1 Feb. 15, 2024

(51) Int. Cl.
*G06Q 20/24* (2012.01)
*G06Q 20/22* (2012.01)
*H04L 67/306* (2022.01)

(52) U.S. Cl.
CPC ........... *G06Q 20/24* (2013.01); *G06Q 20/227* (2013.01); *H04L 67/306* (2013.01)

(58) Field of Classification Search
CPC ..... G06Q 20/24; G06Q 20/227; H04L 67/306
See application file for complete search history.

(56) References Cited

U.S. PATENT DOCUMENTS

| | | | | |
|---|---|---|---|---|
| 10,540,646 B2 * | 1/2020 | Schlosser | ............... | G06Q 20/29 |
| 10,909,582 B1 * | 2/2021 | Brandt | .................. | H04L 63/102 |
| 10,915,881 B2 * | 2/2021 | Kumar | .................... | G06Q 20/29 |
| 2002/0077969 A1 * | 6/2002 | Walker | .................... | G06Q 20/20 705/38 |
| 2002/0103753 A1 * | 8/2002 | Schimmel | .............. | G06Q 20/04 705/39 |
| 2012/0066121 A1 * | 3/2012 | Shahbazi | .............. | G06Q 20/384 705/40 |

(Continued)

FOREIGN PATENT DOCUMENTS

| | | | | | |
|---|---|---|---|---|---|
| AU | 2017202809 A1 | * | 5/2017 | ............. | G06Q 20/12 |
| WO | WO-2017077426 A1 | * | 5/2017 | ........... | G06Q 20/223 |

OTHER PUBLICATIONS

Method and system for crowd payment (Year: 2018).*
Group Purchase: a Win-Win Combination of Social Networking Services with E-commerce (Year: 2010).*

*Primary Examiner* — Scott C Anderson
*Assistant Examiner* — James H Miller
(74) *Attorney, Agent, or Firm* — Lee & Hayes, P.C.

(57) ABSTRACT

Techniques described herein are directed to integration of multi-user interactions using data linkage. The techniques include receiving a request to initiate a transaction associated with a condition for purchase of an item and causing indicators of user profiles to be presented via a user interface. Input data indicating a selection of a user profile is received and an interactive element can be generated and embedded with data that allows for the user profile to participate in the transaction. Based on sending the interactive element to a user device, an indication that the user has requested to participate in the transaction can be received and payment of the transaction can be facilitated using an account associated with the first user profile, an account associated with the second user profile, and/or an account associated with a service provider.

20 Claims, 19 Drawing Sheets

(56) References Cited

U.S. PATENT DOCUMENTS

| | | | | |
|---|---|---|---|---|
| 2013/0085887 A1* | 4/2013 | Zhang | G06Q 40/00 |
| | | | 705/26.8 |
| 2013/0204780 A1* | 8/2013 | Karri | G06Q 20/384 |
| | | | 705/40 |
| 2013/0275262 A1* | 10/2013 | Champlin | G06Q 20/22 |
| | | | 705/26.8 |
| 2014/0122338 A1* | 5/2014 | Cueli | G06Q 40/00 |
| | | | 705/35 |
| 2014/0156517 A1* | 6/2014 | Argue | G07G 1/0081 |
| | | | 705/40 |
| 2014/0172704 A1* | 6/2014 | Atagun | G06Q 20/322 |
| | | | 705/44 |
| 2014/0222663 A1* | 8/2014 | Park | G06Q 20/027 |
| | | | 705/39 |
| 2014/0328521 A1* | 11/2014 | Colangelo | G06Q 10/10 |
| | | | 382/118 |
| 2017/0124540 A1* | 5/2017 | Chan | G06V 40/172 |
| 2017/0193477 A1* | 7/2017 | Holt | G06Q 20/102 |
| 2017/0372282 A1* | 12/2017 | Sarin | G06Q 20/102 |
| 2018/0012300 A1* | 1/2018 | Imrey | G06Q 40/03 |
| 2018/0300708 A1* | 10/2018 | Dar | G06Q 20/36 |
| 2018/0335928 A1* | 11/2018 | Van Os | G06Q 20/204 |
| 2019/0012612 A1* | 1/2019 | Skeen | G06Q 30/0643 |
| 2019/0197513 A1* | 6/2019 | Rodriguez | G06Q 20/3572 |
| 2019/0197514 A1* | 6/2019 | Tineo | G06Q 20/4015 |
| 2020/0151697 A1* | 5/2020 | Pinto | G06Q 20/102 |
| 2020/0394705 A1* | 12/2020 | Daie | G06Q 30/0643 |
| 2021/0042724 A1* | 2/2021 | Rathod | G07G 1/0054 |
| 2021/0065174 A1* | 3/2021 | Singh | G06Q 20/3676 |
| 2022/0005045 A1* | 1/2022 | Wu | G06V 40/16 |
| 2022/0084134 A1* | 3/2022 | Brock | G06Q 20/4037 |

* cited by examiner

INTEGRATION OF MULTI-USER INTERACTIONS USING DATA LINKAGE

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
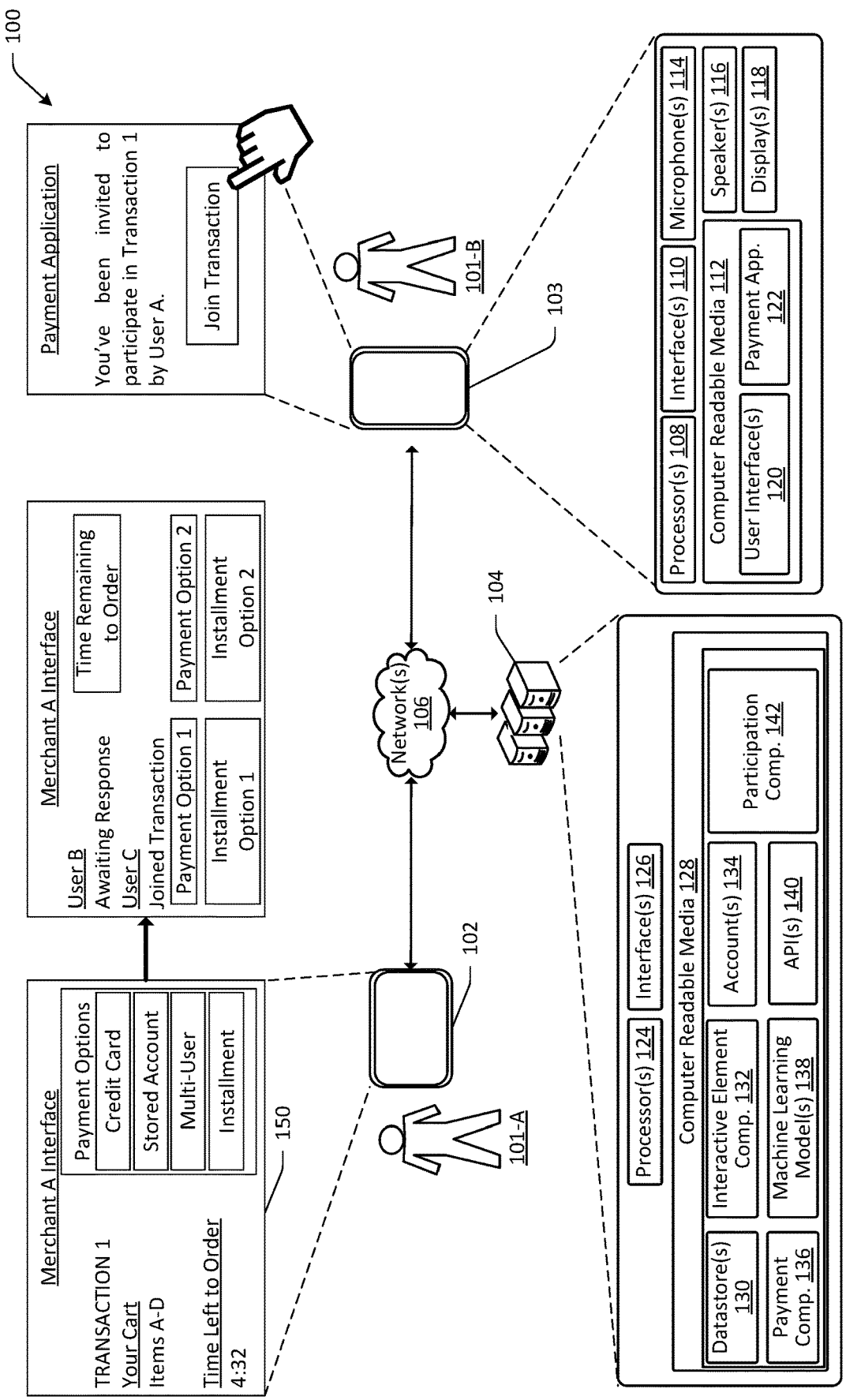
FIG. 1 is an example environment for integration of multi-user interactions using data linkage, according to an embodiment described herein.

Techniques described herein are directed to, among other things, integration of multi-user interactions using data linkage. In an example, techniques described herein enable multiple users to participate in a single transaction for portions of an item or items. In an example, a first user can initiate a transaction associated with one or more items (e.g., goods and/or services). In some examples, an item can be divisible (e.g., into portions). In some examples, multiple items can be related, for example, based on proximity, similarity, association with an event, or the like. In some examples, initiation of the transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated.

In some examples, techniques described herein can generate interactive elements, such as interactive links, that can be embedded with data that is particular to the transaction and/or each of the additional user(s). The interactive elements can be provided to the additional user(s) and, when individual of the additional user(s) interact with the interactive elements indicating an intent to join the transaction, they can be associated with the transaction. That is, the interactive elements can enable the linkage of interactions (e.g., with interactive elements) with particular transactions (e.g., shared channels associated therewith). In this way, techniques described herein can facilitate "social purchasing" wherein multiple users can be associated with a transaction via data linkage. The interactive element can correspond to a link, a deep link, a bar code, a quick response (QR) code, or any other element that is capable of interaction. In some examples, the interactive element can have data embedded therein to trigger a transfer of funds, associate a user with a particular transaction, create an open ticket or shared cart, assign items or item portions in a transaction, etc. In some examples, the interactive element may be selected by the secondary user(s) to cause display of functionality associated with the multi-user transaction on the secondary user device. The functionality may be particularly robust and may update on-the-fly to provide potential secondary users with real-time information about the multi-user transaction. Such information may include an identifier of the multi-user transaction, which users have opted into the transactions, which users have determined not to opt in, which users have not yet responded, which item(s) are attributable to each potential secondary user, whether a condition of the transaction (e.g., such as a time window lapsing) has been satisfied, payment options that may be available, etc. In examples, the characteristics of the items described herein may be utilized to determine which item or portion of an item should be attributed to a given user.

In some examples, techniques described herein can facilitate payment for the multi-user transaction. Such payments can be made by a single user associated with the transaction, each of the users associated with the transaction, and/or a payment service. In some examples, the payment service can enable one or more of the users to utilize credit, a loan, a cash advance, or other financing offer, that in some examples can be repaid in one or more installments, as payment for at least a portion of the transaction.

Take, for example, a situation where a first user desires to purchase four adjacent tickets for seats at a concert, or the first user desires to rent a dwelling with rooms for the first user and three other users (four total rooms). In an example, the first user (otherwise described herein as a primary user that initiated the transaction) may provide user input data indicating an intent to initiate a transaction. This input may be received at a user interface associated with an ecommerce website associated with a merchant or plurality of merchants (e.g., a marketplace), a point of sale (POS) terminal physically located at a merchant location, in association with a payment application of a payment service (e.g., executing on a user device of the first user), etc. In at least one example, a payment service can analyze the input to determine whether a transaction is a candidate for enabling social purchasing with multiple users via a multi-user transaction. In some examples, a transaction can be determined to be a candidate for such social purchasing based at least in part on the item(s) to be purchased, user data associated with the user initiating the transaction, merchant data associated with a merchant from whom the item(s) are to be purchased, and/or the like. In some examples, the transaction may not be a candidate for such social purchasing, such as when the primary user is buying an item that is not divisible (e.g., a shirt, an oil change, etc.). Determining which items are candidates for social purchasing as described herein may additionally be based at least in part on output from one or more machine-trained models. In this example, a machine learning model may be generated and configured to determine whether characteristics associated with the item(s) at issue are likely to indicate that the item(s) are candidates for a social purchase. Feedback data indicating whether a social purchasing option was selected may be utilized to train the machine learning models, and these machine-trained models may be utilized to more accurately identify items as candidates for social purchasing.

Once a transaction is identified as a potential multi-user transaction, the user interface presented to the primary user may be updated, customized, or otherwise manipulated to enable the multi-user transaction. When enabled, the user interface may be caused to present functionality for the primary user associated with a first user profile to select one or more other user profiles associated with potential users to invite to participate in the transaction. It should be understood that when a "user" is referenced herein, that person or entity may be associated with a "user profile" indicating data associated with the user. In some examples, identification of potential users, and/or associated user profiles, to invite can be based on proximity (e.g., other users that are within a threshold distance of the primary user). In some examples, identification of potential users, and/or associated user profiles, to invite can be based on an existing relationship (e.g., which can be based on user contacts data, social networking data, transaction data, or the like). User contacts data from the payment service, the payment application, the primary user's device, third-party applications (e.g., social networking service providers), or any other source may be utilized to present potential user profiles to the primary user. That is, at least some of the potential users, and/or associated user profiles, to invite to participate in the transaction can be based on contacts of the user as determined from the user contacts data. In some examples, however, the primary user need not have an existing relationship with a potential user to invite to participate in the transaction. In an example, selection of participants (e.g., users and/or user profiles) may be customized based on user preferences and characteristics of the item(s) in the transaction.

In some examples, as described above, initiation of the multi-user transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated. The shared channel can be associated with multiple user profiles representative of users participating in the multi-user transaction. The shared channel can facilitate the multi-user transaction.

In the concert ticket example above, the primary user profile may be able to identify which seat (or item or portion of an item) is to be associated with which potential other user profile, prices for each potential other user profile, priority of potential other user profiles, etc. In other examples, the payment service may determine what aspects of the transaction are to be associated with the various potential other user profiles. In still other examples, these aspects may not be specified by the primary user profile or the payment service, but may ultimately be determined by the other user profiles that opt into transaction participation. For example, the seats may be first come first served.

Once potential other user profiles(s) are identified, the payment service may generate one or more interactive elements embedded with data that may be sent to devices of the potential other user profiles. Each interactive element may be user specific, transaction specific, item specific, etc. For example, a given secondary user may receive an interactive element identifying a specific item to be assigned to the secondary user if the secondary user opts into the transaction. In at least one example, an interactive element can link invited user(s) to a particular transaction (e.g., by associating them with a shared channel, such as an open ticket, shared cart, or the like). As such, the interactive elements as described herein can facilitate multi-user interactions using data linkage. In some examples, generation of the interactive element may be dynamic and may change prior to completion of the transaction. In such examples, the interactive element, when selected, may cause a payment application or other user interface to be enabled and to display functionality for receiving user input data indicating a request to participate in the transaction, as well as, in examples, selection of details about the transaction to be assigned to the potential other user. As used herein, a "participant" can refer to a user that has provided user input data requesting to opt into a multi-user transaction as described herein.

In examples, the user interface utilized to receive input data indicating selection of potential other users may be updated dynamically as the transaction proceeds. That is, interaction data or acceptance data can be monitored in real-time or near-real-time to determine a state associated with each of the other potential users (e.g., invitation sent, awaiting response, joined transaction, etc.). In an example, the user interface may be updated to indicate the selected potential other users and a status for each user showing whether the user has opted into the transaction, whether a response is pending, etc. Once other users have opted into the transaction and one or more conditions have been satisfied, if applicable, the payment service may initiate processing payment of the transaction. Further, in some examples, the user interface may be updated to indicate that the transaction is complete or that the condition(s) to initiate a payment phase of the transaction have been satisfied. Details about the transaction may also be provided via the user interface, such as which item or item portion has been attributed to a given user in the multi-user transaction.

When facilitating the transaction, one or more techniques may be employed to complete the transaction and to acquire funds for payment of the transaction. In one example, an account of the primary user may be queried (e.g., accessed for withdrawing funds therefrom) for all of the funds for the transaction, and those funds may be deposited in an account of the merchant from which the item(s) are being purchased. Thereafter, accounts of the other users participating in the transaction may be queried for a portion of the total funds attributable to the other users, and those funds may be deposited into the primary user account as a reimbursement. In another example, the payment service may query the various user accounts of the participating users for funds attributable to each user, and the payment service may aggregate and deposit these funds in the merchant account. In still another example, the payment service may withdraw the funds for the transaction from an account of the payment service, and thereafter may deduct funds attributable to each user from the various user accounts as reimbursement to the payment service account. The payment service may determine which payment process to utilize for a given transaction based at least in part on user data associated with the users participating in the transaction, merchant data associated with the merchant from whom the items are being purchased, transaction data indicating details of the transaction, risk determinations indicating how likely it is that one or more of the users will (or will not) pay for the item(s), etc.

Payments can be made using any variety of payment instruments such as credit cards associated with accounts of users, debit cards associated with accounts of users, stored balances associated with accounts of users, linked bank accounts associated with accounts of users, financing offered by the payment service (e.g., credit, loan, cash advance, installment loan, etc.), or the like. In some examples, one or more payment installment plan options may be surfaced to the users in the multi-user transaction. Typically, a payment installment plan provides a user with the option to pay for an item or items over time, making predefined partial payments over a certain number of installments (e.g., four monthly payments of $25 for a $100 item). In the multi-user transactions described herein, the payment installment plans may differ. For example, a first installment plan option may be presented to one of the users while a second, different installment plan option may be presented to another of the users in the same multi-user transaction. The payment service may determine which of multiple potential installment plans are to be presented as options to a given user based at least in part on user data for the user(s), prior transaction data, transaction data associated with the current transaction, user preferences, etc. By so doing, the payment service may determine user-specific installment plan options on-the-fly prior to conclusion of the transaction. This may provide potential users with needed information to determine whether to opt into the transaction in a way that could not be performed absent the time sensitive, on-the-fly determinations described herein. In examples, identification of installment plans as options for a given user may be based at least in part on machine learning techniques as described more fully below.

In addition to presenting potentially differing installment plans to various users in the same multi-user transaction, the payment service may determine how installments are to be paid as between the users in the multi-user transaction. Take, for example, a situation where the multi-user transaction includes the purchase of four $200 tickets for concert seats (total of $800). In certain examples, the payment service may present a payment installment plan option where four $200 payments are made over time to satisfy purchase of the transaction. Upon selection of such a payment installment plan option, the payment service may determine how to allocate payments for each user associated with the installment plan. In one example, each user may pay one of the four installments such that one user pays $200 to satisfy the first installment, another user pays $200 to satisfy the next installment, etc. In another example, each user may pay a portion of each installment. Using the example above, the four users may each pay $25 toward each installment in the installment plan. The payment service may determine which payment options are available to the users based at least in part on user data for the users, transaction data for the transaction at issue, prior transaction data, etc. Additionally, machine learning techniques may be utilized to determine which payment options to make available to reduce probability of nonpayment on the installment plan, as discussed more fully below.

In association with the operations described above, with the proliferation of digital platforms for sharing information and for performing transactions, there is a computer-centric problem of integrating functionality of disparate digital platforms and what would otherwise be separate transactions in a way that promotes multi-user transactions in a secure manner. For example, the time-sensitive nature of many multi-user transactions does not allow for a manual user-centric solution. Instead, as described herein, various analytic operations associated with identifying potential multi-user transactions, generation of interactive elements, and dynamic and configurable payment facilitation are employed to ensure that such transactions occur within the time sensitive windows discussed herein and in a way that integrates functionality of these disparate digital platforms to facilitate secure multi-user transactions. To solve these and other computer-centric problems, the techniques and systems described herein utilize computer-centric solutions associated with a secure payment application and a payment service.

Additionally, ecommerce transactions are historically limited to single-user transactions due to authentication requirements and digital communication restraints between user devices, merchant devices, payment service systems, and payment instrument institutions. Given the complex nature of sending personal account numbers and authentication information through and to each of these devices and systems, often times requiring multiple levels of encryption and decryption in a short period of time, current systems are not configured to complete a digital transaction that involves more than one user. The computer-centric solutions described herein allow for multi-user transactions by generating user-specific and transaction-specific interactive elements embedded with data that allows multiple user devices to securely communicate data associated with the transaction such that the described payment service can communicate with payment instrument institutions as well as systems storing user balance accounts to cause a transaction to be performed with multiple users utilizing the communication protocols and authentication requirements of those various systems and without requiring coding changes by such systems. This solves the complex nature of sending personal account numbers and authentication information through and to each device and system by the payment service utilizing a standardized format for communicating transaction updates between users and with merchant systems.

In addition to the above, the nature of ecommerce transactions, and particularly the ecommerce transactions described herein that deal with multi-user transactions, is time sensitive. For example, in a non-ecommerce transaction (e.g., a brick-and-mortar transaction) a user may go to a store, pick out an available item, and initiate a transaction at a cash register at any point thereafter. Ecommerce transactions, to the contrary, involve thousands of potential customers across thousands of locations purchasing items via network-connected computing devices. As such, item availability changes second by second, and the display of item availability for purchase is updated dynamically, on-the-fly, and based on potentially hundreds or thousands of user sessions involving a given merchant. This solves the above-mentioned problems of ecommerce transactions by allowing for the on-the-fly identification of multi-user candidate transactions, generation of user-specific interactive elements, and then the facilitation of multi-user transactions within a limited time window.

Furthermore, the techniques described herein include the generation and training of machine learning models to, among other things, generate time sensitive actionable recommendations, interactive elements, and payment options associated with multi-user transactions. The use of specifically trained machine learning models grounds the techniques described herein in a computer-centric environment and produces results that offer improvements over conventional technologies. These improvements include, for example, time sensitive identification of candidate multi-user transactions, determinations on how interactive elements should be formatted for given users and given items, which payment options should be presented to given users, etc. The models may be trained again and again over time, each time learning new parameters or updating parameter weighting to make the results of those models more accurate, more timely, etc.

Also, multi-user transactions such as those described herein require data transmission across disparate devices and systems all within a limited period of time. This would typically lead to networking issues in the network of devices where communication protocols across the various device and system type differ. However, utilizing the techniques described herein, a network of user devices and systems may be generated when a transaction is identified as being a multi-user transaction. To do so, user profiles are parsed to determine which users are participants in the multi-user transaction, which devices are associated with those users, and parameters for sending and displaying interactive elements for those devices. The identified devices are then associated to form a network that provides communication between the devices and a system, such as the payment service. The network may be "secure" in that it transmits communications and/or data via the payment service and/or other secured integrations. The established network of devices and system can be utilized to securely send data related to the multi-user transaction to the various devices and systems. This marks an improvement over existing techniques by creating a secure network of devices and systems that include the multiple users in the multi-user transaction, whereas existing techniques require the use of multiple networks for each user to a transaction.

It should be noted that the exchange of data and/or information as described herein may be performed where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed where a user has provided consent for performance of the operations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for integration of multi-user interactions using data linkage, according to an embodiment described herein. The environment 100 of FIG. 1 may include a user 101-A (also described herein as a primary user 101-A) associated with a primary user device 102, another user 101-B (also described herein as a secondary user 101-A), associated with a secondary user device 103, and a payment service 104, which can communicate via network(s) 106. A primary user 101-A can be any user that initiates a multi-user transaction as described herein, and a secondary user 101-B may be any user that may opt into a multi-user transaction, such as by selecting an interactive element sent to the secondary user device 103, or otherwise joins a multi-user transaction after the primary user.

Each of the devices can comprise one or more computing devices. Additional details associated with the primary user device 102, the secondary user device 103, the payment service 104, and the network(s) 106 are described below with reference to FIGS. 10-14.

The secondary user device 103 (as well as the primary user device 102) may include one or more components such as one or more processors 108, one or more network interfaces 110, computer-readable media (CRM) 112, one or more microphones 114, one or more speakers 116, and/or one or more displays 118. The microphones 114 may be configured to receive audio input from the environment 100 and to generate corresponding audio data, which may be utilized as discussed herein. The speakers 116 may be configured to output audio, such as audio associated with a given multi-user transaction. The displays 118 may be configured to present graphical user interfaces. In some examples, the displays 118 can output images, videos, or the like via such graphical user interfaces.

The primary user 101-A and secondary user 101-B can interact with each other, via their respective devices, in various scenarios. In a first example scenario, the primary user 101-A and the secondary user 101-B can interact with each other in a peer-to-peer context. In a second example scenario, the primary user 101-A and the secondary user 101-B can share music with one another. In a third example scenario, the primary user 101-A and the secondary user 101-B can exchange goods or services with each other. Additional or alternative scenarios can be imagined. It should be understood that a relationship between a primary user 101-A and a secondary user 101-B can be any relationship where the users have interacted with each other previously or have a probability of future interaction. For example, users with an existing relationship may have interacted with each other in the past (e.g., in a multi-user transaction, a peer-to-peer transaction, a point-of-sale transaction, or the like), may be associated with each other in a social media application (e.g., by being "friends" or otherwise connected, having shared, liked, commented, or the like a particular post, be members of a same group, or the like), may have utilized hashtag identifiers associated with each other, may have contacts profiles saved on each other's personal devices, may be associated at least partially with the same payment instrument information, may share contact information, may share account information or otherwise have associated accounts, etc. Some or all of the factors described above may be utilized to determine a probability of future interaction. The probability of future interaction can be determined, for example, using a trained machine learning model, one or more rules, heuristics, or the like. As an example, users that have interacted with each other in the past (whether in relation to multi-user transactions or otherwise) may be determined to have a greater probability of being involved in future interactions than users with less or no past interaction events. While a single secondary user 101-B is shown and described, any number of secondary users can participate in multi-user transactions.

The CRM 112 may include one or more applications or other components. For example, the one or more applications or other components can include one or more user interface(s) 120 and a payment application 122. A user interface 120 can be included in the payment application 122 as a graphical user interface, an interstitial, a widget, or a pop-up display. The CRM 112 can include additional or alternative applications such as a music streaming application, a messaging application, an email application, a forum application, a merchant application, a marketplace application, or the like. In some examples, the applications can be provided by a same service provider (e.g., the payment service) or different service providers, such as the payment service and one or more third-party service providers.

The applications or other components may be configured to execute in the foreground and background of the secondary user device 103. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the secondary user device 103 and/or with payment service 104 associated with the payment application 122. For example, a social media application may be executing in the foreground and an interaction with an interactive element as described in more detail (e.g., to opt into a multi-user transaction) herein may occur. The payment application 122, running in the background, may be caused to be displayed in the foreground in response to selection of the interactive element in the social media application. In some such examples, the payment application 122 can transition to the foreground to perform payment operations or can remain in the background and payment operations can be performed without the payment application 122 transitioning to the foreground. In other examples, the payment application 122 itself may be utilized to display interactive elements associated with multi-user transactions. It should be understood that the user interfaces 120 described herein may include the payment application 122 and/or may include one or more other user interfaces as described herein. It should also be understood that the payment application 122 or the functionality associated therewith can be integrated into other applications, such as third-party applications.

The payment service 104, which can be associated with one or more computing devices, such as server computing devices, may include components such as one or more processors 124, one or more network interfaces 126, and/or CRM 128. The CRM 128 may include one or more components such as, for example, datastore(s) 130, an interactive element component 132, one or more accounts 134, a payment component 136, one or more machine learning models 138, one or more application programming interfaces (APIs) 140, and a participation component 142. These components will be described below by way of example.

In at least one example, the payment service 104 can expose functionality and/or services via the one or more APIs 140, thereby enabling functionality and/or services described herein to be integrated into various functional components of the environment 100. The API(s) 140, which can be associated with the payment service 104, can expose functionality described herein and/or avail payment services to various functional components associated with the environment 100. At least one of the API(s) 140 can be a private API, thereby availing services and/or functionalities to functional components (e.g., applications, etc.) that are developed internally (e.g., by developers associated with the payment service). At least one of the API(s) 140 can be an open or public API, which is a publicly available API that provides third-party developers (e.g., social media platforms described herein) with programmatic access to a proprietary software application or web service of the payment service. That is, the open or public API(s) can enable functionality and/or services of the payment service to be integrated into one or more applications. The API(s) 140 can include sets of requirements that govern how applications, or other functional components, can interact with one another.

In some examples, the payment service 104 can provide third-party entities with a software developer kit ("SDK") that may utilize functionality exposed by the API(s) 140. The SDK can include software development tools that allow a third-party developer (i.e., a developer that is separate from the payment service) to include functionality and/or avail services as descried herein. The SDK and/or the API(s) 140 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store payment data associated with payment instrument(s) and/or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile (which may be standalone accounts or stored balances or sub-accounts or stored balances), which can be associated with different groups of users and/or assets, such as stocks, cryptocurrency, non-fungible tokens, or the like. In some examples, a user profile can include historical group data, geographic data, user preferences, subject matter preferences, transaction data, contacts data, social relationship data, user preferences, metadata tag data, and other information associated with participation in multi-user transactions. Additional details associated with data that can be stored in association with user profiles are provided below.

In some examples, a multi-user transaction as described herein can be associated with a metadata tag representative of the multi-user transaction. In some examples, the metadata tag can be used in lieu of payment data to make a payment to the multi-user transaction. In some examples, multi-user transactions can be represented by data objects that are stored in the datastore(s) 130. Such data objects can be used for tracking states associated with such multi-user transactions. In some examples, such data objects can be associated with one or more balances from which funds can be transferred or into which funds can be received using a ledger system as described herein. In some examples, multi-user transactions can be associated with a user interface 120 that is specific to the multi-user transaction at issue and may be displayed, for example, via the payment application 122. In some examples, such multi-user transaction specific user interfaces 120 can provide information about the multi-user transaction and can include one or more interactive elements to initiate a multi-user transaction or to opt into such a transaction.

With respect to the participation component 142, the primary user 101-A may provide user input data indicating an intent to initiate a transaction with a merchant, such as through the user interface 150 shown in FIG. 1. This input data may be received at the user interface 150 associated with an ecommerce website associated with a merchant or a plurality of merchants (e.g., a marketplace), a POS terminal physically located at a merchant location, in association with the payment application 122 or another application, etc.

The transaction can be associated with an item or items. The item, as described above, can be divisible into portions. Such portions can be equal portions or unequal portions. In examples where the transaction includes a single item or items that are divisible, the participation component 142 may be configured to determine how items are divisible. For example, the participation component 142 may identify a number of portions of the item (e.g., a number of tickets that may be purchased together for a concert, a number of seats booked on a flight, a number of bedrooms in a lodging rental booking, etc.). In an example, to identify the number of portions, the participation component 142 may utilize data from the merchant in question, such as text data from advertisements or from an ecommerce website of the merchant. Additionally, a machine learning model 138 may be utilized to identify the number of portions. In this example, the machine learning model 138 may be trained utilizing transaction data indicating how previously purchased items are split or bundled.

In some examples, items, as described above, can be related. In some examples, items can be related based at least in part on one or more attributes associated with the items. For example, certain items may be associated with item types that have been predetermined to be related, such as concert tickets, airline tickets, rooms in lodging booking, etc. That is, an item type can be an attribute, which can indicate that items of such item types are related to other items having the same item type. Item types may be determined based at least in part on user input data, user feedback data, machine learning techniques, etc. In some examples, items can be related based at least in part on the items being associated with the same event, such as a flight, concert, lodging reservation, etc. That is, an event can be an attribute associated with an item and can be used to determine that two items associated with a same event are related. In some examples, items may be related based on geographic location data indicating that the items are physically located in the same environment or are otherwise associated with the same environment. That is, a geographic location can be an attribute of an item and two or more items with a same geographic location or geographic locations within a threshold distance of one another can be determined to be related. As such, whether an item is related to another item may be based at least in part on, for example, whether the items are physically proximate to each other, whether one item is an additional instance of another item, whether one item is designated as being similar to another item, or whether items are associated with the same event.

In some examples, the participation component 142 can be configured to determine whether a particular transaction, or portion thereof, is a candidate for a multi-user transaction. In some examples, the participation component 142 can utilize context associated with a transaction to determine whether the transaction, or portion thereof, is a candidate for a multi-user transaction. In some examples, the context may indicate a merchant involved in the transaction, one or more items involved in the transaction, a number of items involved in the transaction, a relationship between items in a transaction, a cost of the one or more items in the transaction, etc. Additional examples of context that may be utilized to identify a transaction as a multi-user transaction is provided herein. In some examples, types of context may be identified as relevant using machine learning techniques where one or more machine learning models identify such other factors as contributing to a determination that a transaction is a candidate multi-user transaction.

In certain examples, the context may include a condition. In some examples, a condition is to be satisfied for the transaction to be completed successfully, and the participation component 142 may utilize these conditions to identify a transaction as a candidate multi-user transaction. In examples, the condition may be a time window for purchasing the item(s) at issue. In these and other examples, the participation component 142 may be configured to identify, for a given transaction, that the transaction includes the condition to be satisfied and that the transaction is for the purchase of multiple items or for an item that has multiple portions. These conditions may be considered as indicators by the participation component 142 that the transaction at issue is a candidate for a multi-user transaction. For example, the participation component 142 may identify one or more of these conditions for a particular transaction, and may flag the transaction as a candidate for a multi-user transaction based at least in part on the transaction being associated with the one or more of these conditions. In other examples, merchants or users may provide user input data identify a particular transaction as a candidate multi-user transaction, and the participation component 142 may utilize that user input data to flag the transaction as a candidate for a multi-user transaction. In one example, when the transaction at issue is associated with a time window for purchase, this factor may be utilized by the participation component 142 to identify the transaction as a candidate multi-user transaction. Additionally, when the transaction is associated with more than one item, the participation component 142 may utilize such data as an indicator of the transaction being a potential multi-user transaction candidate. Additional factors such as item categories, merchant categories associated with the items, prior transaction data indicating multi-user transactions, and any other data may be utilized by the participation component 142 to determine whether to identify a transaction as a candidate multi-user transaction. Each of these factors may be weighted by the participation component 142 to increase the accuracy of identifying transactions as candidate multi-user transactions. For example, if multiple items are involved in the transaction but other factors such as item categories or merchant categories do not indicate the transaction is likely to be a multi-user transaction, the participation component 142 determine that the transaction is not a candidate multi-user transaction. However, when the item category or merchant category indicates the item at issue is typically involved in a multi-user transaction, even if only one item is involved in the transaction, the transaction may be identified as a multi-user transaction.

Determining which items are candidates for social purchasing as described herein may additionally be based at least in part on output from one or more machine-trained models 138. In this example, a machine learning model 138 may be generated and configured to determine whether characteristics associated with the item(s) at issue are likely to indicate that the item(s) are candidates for a social purchase. Feedback data indicating whether a social purchasing option was selected may be utilized to train the machine learning models 138, and these machine-trained models 138 may be utilized to more accurately identify items as candidates for social purchasing.

In some examples, once a transaction is identified as a potential multi-user transaction, the user interface 120 presented to the primary user 101-A may be updated, customized, or otherwise modified to include a selectable element to enable adding other participant(s) to the transaction. In some examples, the selectable element represents an option to find participants for the multi-user transaction. In other examples, the participation component 142 may cause suggestions to add participants to be provided without having first received a request to do so from a user. In some examples, other user profiles may be suggested to join a transaction even if the transaction is not identified as a candidate multi-user transaction, particularly where the user at issue has previously engaged in multi-user transactions. Doing so may provide the option to make a traditionally single-user transaction into a multi-user transaction. For example, a user may desire to split a cost of a service, such as an oil change, or gas with another user and can add the other user to the transaction without the transaction having first been identified as a multi-user transaction.

In an example, the user interface 120 may be caused to present functionality for the primary user 101-A, who is associated with a first user profile, to select one or more other user profiles associated with potential secondary users 101-B to invite to participate in the transaction. In an example, the participation component 142 can surface potential other participants (e.g., users and/or user profiles) or groups of participants based on context (e.g., users in a message associated with a particular item or transaction, etc.), similarity (e.g., other users who follow a band or like a same post), proximity (e.g., distance between two or more users), recent or frequent transactions, users in the same group(s) as the user, etc. In some examples, the participation component 142 can surface potential other participants using user contacts data from the payment service 104, the payment application 122, the primary user's device 102, or any other source. In an example, selection of participants may be customized based on user preferences and characteristics of the item(s) in the transaction.

In some examples, item(s) and/or portions of item(s) that are to be associated with a multi-user transaction can be determined and/or designated by the primary user 101-A. In some examples, items or item portions may be allocated based on user input data from the primary user 101-A. In this example, prior to an invitation to join the transaction being sent to the secondary users 101-B, the primary user 101-A may have provided user input data that assigns certain items or item portions in the transaction to the various secondary users 101-B. In other examples, rules may be established for allocating items and item portions, such as based on which secondary users 101-B confirm participation in the transaction first, which secondary users 101-B have previously been involved in a multi-user transaction with the primary user 101-A, which users are priority users as identified from context data associated with the transaction or user profile data associated with the primary user 101-A or the secondary users 101-B, or the like. In some examples, a machine learning mechanism can output indications of how item(s) or portion(s) of item(s) are to be allocated. For example, machine learning models 138 may be trained with transaction data indicating how previously purchased items are split or bundled among users, and the machine learning model 138 may then utilize, as input, factors identified from the transaction data to determine how items or portions of items are to be allocated.

In a concert ticket example, the primary user 101-A may be able to identify which seat (or item or portion of item) is to be associated with which potential secondary user, prices for each potential secondary user, priority of potential secondary users, etc. In other examples, the participation component 142 may determine what aspects of a multi-user transaction are to be associated with the various potential secondary users. In still other examples, these aspects may not be specified by the primary user 101-A or the payment service 104, but may ultimately be determined by the other users that opt into transaction participation. For example, the seats may be first come first served. In other examples where a single item is purchased, such as rental of a residence, portions of the item may be attributed to each of the secondary users. For example, the residence may have three rooms each having different qualities that may impact price or value. The primary user 101-A may be assigned or otherwise associated with one of the rooms, one secondary user 101-B may be assigned or otherwise associated with another of the rooms, and another secondary user 101-B may be assigned or otherwise associated with the remaining room. Each room may be associated with a given price.

In some examples, initiation of the transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated. Invited members can have a temporary association with the shared channel, which can transition to a formal association with the shared channel upon acceptance or agreement to participate in the transaction. Temporary and formal associations may provide different functionalities for the users, for example, with respect to payment, access, transferability, usability, or the like.

Once potential secondary users 101-B are identified, the interactive element component 132 may generate one or more interactive elements embedded with data that may be sent to devices 103 of the potential secondary users. Each interactive element may be user specific, transaction specific, item specific, etc. Additional details on how interactive elements are generated are provided below. In an example, the interactive element may be generated as a selectable element with information that is displayed to the user in a certain manner. For example, a given secondary user 101-B may receive an interactive element identifying a specific item to be assigned to the secondary user 101-B if the secondary user 101-B opts into the transaction. The interactive element may also indicate the condition to be satisfied for the transaction to proceed, such as an amount of time left to complete the transaction or for the potential secondary user 101-B to opt in. As such, the interactive element may be dynamic and may change prior to completion of the transaction. In examples, the interactive element, when selected, may cause the payment application 122 or other user interface 120 to be enabled and to display functionality for receiving user input data indicating an intent to participate in the transaction, as well as, in examples, selection of details about the transaction to be assigned to the potential secondary user 101-B. By so doing, the interactive element may act as a link between the merchant website or payment application 122 being utilized for the transaction, devices of potential secondary users 101-B, and the payment service 104. This provides data linking, as described above, which enables a host of benefits over traditional systems, including securely performing a transaction between multiple users and a merchant, intelligently determining when and how to generate and send interactive elements, determining when a transaction is a candidate multi-user transaction, etc.

The interactive element component 132 may generate an interactive element that may be configured to be shared and displayed in the payment application 122 and outside of the payment application 122, such as on one or more social media applications, email applications, messaging applications, etc. The interactive element can correspond to a link, a deep link, a bar code, a QR code, or any other element that is capable of interaction. In some examples, the interactive element can have data embedded therein to trigger a transfer of funds, associate a user with a particular transaction, create an open ticket or shared cart, assign items or item portions in a transaction, etc. In some examples, the interactive element may be selected by the secondary user(s) to cause display of functionality associated with the multi-user transaction on the secondary user device 103. The functionality may be particularly robust and may update on-the-fly to provide potential secondary users with real-time information about the multi-user transaction. Such information may include an identifier of the multi-user transaction, which users have opted into the transactions, which users have determined not to opt in, which users have not yet responded, which item(s) are attributable to each potential secondary user, whether a condition of the transaction such as a time window lapsing has been satisfied or a status associated therewith, payment options that may be available, etc. In examples, the characteristics of the items described herein may be utilized to determine which item or portion of an item should be attributed to a given user profile.

As shown in FIG. 1, when a transaction is identified as a potential multi-user transaction, an option to find participants for the transaction may be displayed. The primary user 101-A may select the option and may provide user input data to select potential secondary user 101-B. Interactive elements may be sent to the selected potential secondary user 101-B, as shown in FIG. 1 with respect to the secondary user device 103. Opt-in states of the potential secondary user 101-B may be displayed on the primary user device 102 of the primary user 101-A.

Once secondary user(s), such as the secondary user 101-B, have opted into the transaction and, in some examples, one or more conditions have been met, the payment service 104 may facilitate processing of the transaction. The one or more conditions may be satisfied based on one or more of a determination that completion of payment for a transaction occurred within a time window, a determination that a threshold number of other users opted into participating in the transaction, a determination that the users have funds available for the transaction, a determination that details for the transaction have been provided such as seat assignments, etc. In examples, the user interface 120 utilized to select potential other users may be updated dynamically, and in real-time or near-real-time, as the transaction proceeds. For example, the user interface 120 may be updated to indicate the selected potential secondary users 101-B and a state for each user showing whether the user has opted into the transaction, whether a response is pending, etc. In an example, after the secondary users 101-B have opted in, the user interface 120 may be updated to indicate that the transaction is complete or that the conditions to initiate a payment phase of the transaction have been satisfied. Details about the transaction may also be provided via the user interface 120, such as which item or item portion has been attributed to a given user in the multi-user transaction. In examples, various payment options may also be displayed on the user interface 120 when response are being received to invitations to participate in the multi-user transactions. As shown by way of example in FIG. 1, two payment options may be presented, such as an option to pay via a stored balance account, an option to pay via credit card, via debit card, etc. In addition, when installment plan options are provided as discussed herein, indicators of the installment plan options may also be provided in the user interface 120.

When facilitating the transaction, one or more techniques may be employed to complete the transaction and to acquire funds for the transaction. To do so, accounts 134 may include an account of the primary user 101-A, accounts of the secondary users 101-B, an account of the merchant, and an account of the payment service 104. In one example, the account of the primary user may be queried for all of the funds for the transaction, and those funds may be deposited in an account of the merchant at issue. Thereafter, accounts of the secondary users participating in the transaction may be queried for a portion of the total funds attributable to the secondary users, and those funds may be deposited into the primary user account as a reimbursement. In another example, the payment component 136 may query the various user accounts of the participating users for funds attributable to each user 101-A, 101-B, and the payment component 136 may aggregate and deposit these funds in the merchant account. In still another example, the payment component 136 may deduct the funds for the transaction from an account of the payment service 104, and thereafter may deduct funds attributable to each user 101-A, 101-B from the various user accounts. The payment component 136 may determine which payment process should be employed for a given transaction based at least in part on user data associated with the users 101-A, 101B at issue, merchant data associated with the merchant at issue, transaction data indicating details of the transaction at issue, risk determinations indicating how likely it is that one or more of the users 101-A, 101-B do not pay for the item(s), etc.

In some examples, the participation component 142 may determine whether apportionment of the items in a transaction to the various users is equal or differs between users, characteristics of the items themselves may be utilized. For example, three airline tickets on the same flight in the same row may be the same value, while in other examples three bedrooms for a given rental booking may differ and thus may have different values. This analysis may be utilized to determine what portion of a cost of a transaction should be apportioned to each user in a multi-user transaction.

In addition to the above, one or more payment installment plan options may be surfaced to the users 101-A, 101B in the multi-user transaction. An example of functionality for an installment option is shown in the user interface 150 with a selectable element for "installment." Typically, a payment installment plan provides a user with the option to pay for an item or items over time, making predefined partial payments over a certain number of installments (e.g., four monthly payments of $25 for a $100 item). In a payment installment plan, the merchant can receive funds for the item or items at the time of the transaction and the payment service or installment service provider can be repaid by the user(s) with whom the payment installment plan has been issued over time. In some examples, a first installment may be paid at the time of the transaction and one or more additional installments can be paid overtime. In some examples, fees associated with the payment installment plan can be paid by the user(s), the merchant, and/or the service provider.

In the multi-user transactions described herein, the payment installment plans may differ. For example, a first installment plan option may be presented to one of the users (e.g., the primary user 101-A) while a second, different installment plan option may be presented to another of the users (e.g., the secondary user 101-B) in the same multi-user transaction. The payment component 136 may determine which of multiple potential installment plans are to be presented as options to a given user 101-A, 101-B based at least in part on user data for the user(s) 101-A, 101-B, prior transaction data, transaction data associated with the current transaction, user preferences, etc. By so doing, the payment component 136 may determine user-specific installment plan options on-the-fly prior to conclusion of the transaction at issue. This may provide potential users 101-A, 101-B with needed information to determine whether to opt into the transaction in a way that could not be performed absent the time sensitive, on-the-fly determinations described herein. In examples, identification of installment plans as options for a given user 101-A, 101-B may be based at least in part on one or more of the machine learning models 138, as described more fully herein with respect to FIG. 9.

In addition to presenting potentially differing installment plans to various users 101-A, 101-B in the same multi-user transaction, the payment component 136 may determine how installments are to be paid as between the users 101-A, 101-B in the multi-user transaction. Take, for example, a situation where the multi-user transaction includes the purchase of four $200 tickets for concert seats (total of $800). In certain examples, the payment component 136 may present a payment installment plan option where four $200 payments are made over time to satisfy purchase of the transaction. Upon selection of such a payment installment plan option, the payment component 136 may determine how each user 101-A, 101-B will pay in association with the installment plan. In one example, each user 101-A, 101-B may pay one of the four installments such that one user pays $200 to satisfy the first installment, another user pays $200 to satisfy the next installment, etc. In another example, each user may pay a portion of each installment. Using the example above, the four users may each pay $25 toward each installment in the installment plan. The payment component 136 may determine which payment options are available to the users 101-A, 101-B based at least in part on user data for the users 101-A, 101-B, transaction data for the transaction, prior transaction data, etc. Additionally, machine learning models 138 may be utilized to determine which payment options to make available to reduce probability of nonpayment on the installment plan, as discussed more fully herein with respect to FIG. 9.

In addition to the above, in certain examples, one or more users in the multi-user transaction may decide to sell back or resale an item or portion of an item from the multi-user transaction. In some of these examples, the price of the item or portion of the item may have increased from the time when the user purchased the item or when the user opted into the multi-user transaction. When this occurs, the payment service 104 may retain at least a portion of the difference between the original price and the price when the item is sold back or resold.

It should also be understood that users added to a given multi-user transaction may be associated with one or more permissions. Those permissions may allow for varying degrees of actions to be performed by various users in the transaction. Example permissions may allow a user to add items to a transaction, edit details about the transaction or items associated with the transaction, share or invite others to the transaction, only opt in to the transaction and purchase the item(s), etc.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
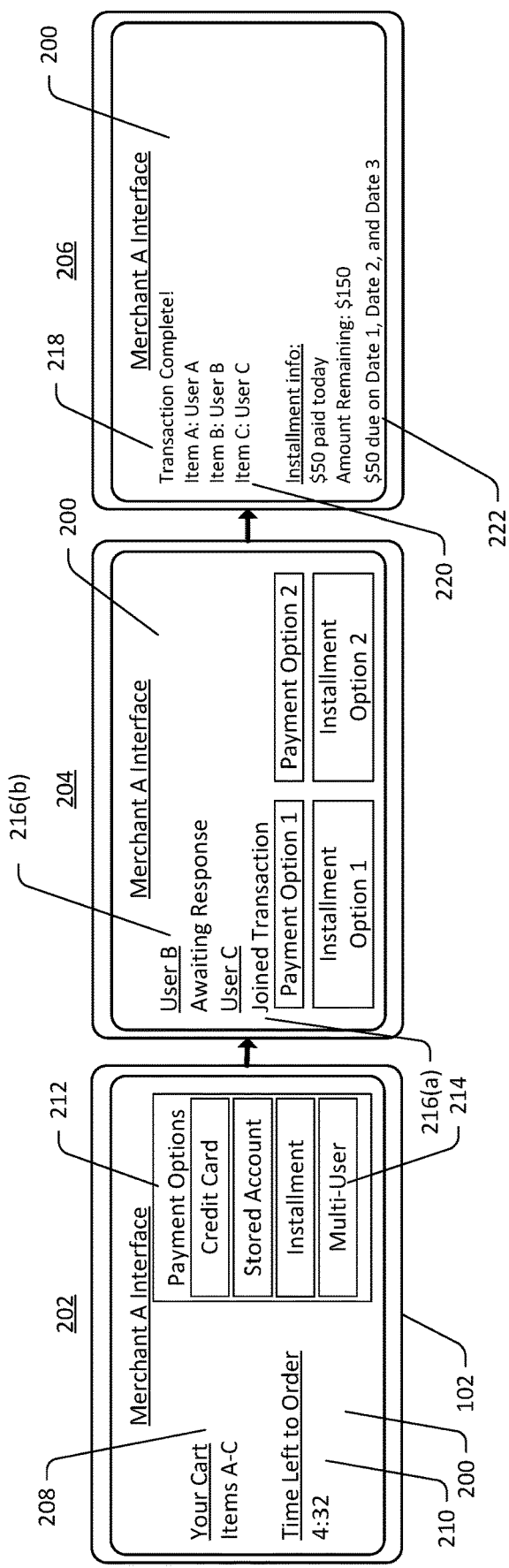
FIG. 2 is an example user interface displayed on an example user device, where the user interface is configured to present an option to select other users to participate in a transaction, user participation statuses, and indications of completed transactions with multiple participants, according to an embodiment described herein.

FIG. 2 is an example user interface 200 displayed on an example primary user device 102, where the user interface 200 is configured to present an option to select other users to participate in a transaction, user participation statuses, and indications of completed transactions with multiple participants, according to an embodiment described herein. The user interface 200 may be the same or similar to one or more of the user interfaces 120 described with respect to FIG. 1.

In examples, the user interface 200 may be presented in association with a merchant ecommerce website, within a payment application such as the payment application 122 described with respect to FIG. 1, or any other application or interface associated with the display of items for sale. In the example of FIG. 2, at step 202, the user interface 200 may be caused to display an indicator of the merchant associated with a to-be-conducted transaction along with an item description 208. The item description 208 may provide an identifier of the item(s) that a primary user has expressed a desire to purchase. The user interface 200 may also include a condition indicator 210, such as an indicator of an amount of time left to purchase the item(s) before the items are released for purchase by one or more other potential users.

Figure 5:
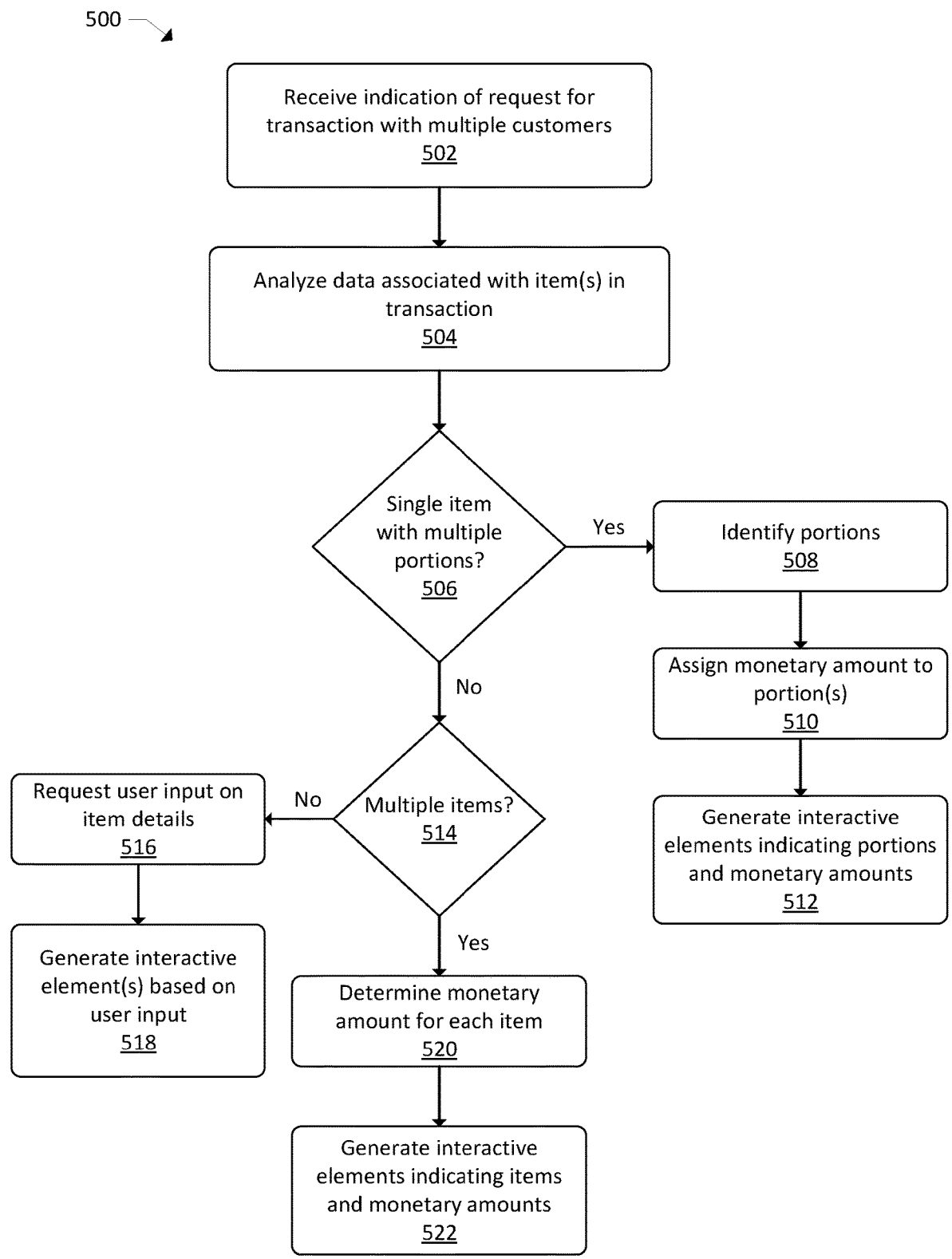
FIG. 5 is a flow diagram of an example process for identifying characteristics of item(s) for use in generating user-specific interactive elements, according to an embodiment described herein.

As described in more detail elsewhere herein, including FIG. 5, a participation component of a payment service associated with the merchant or the primary user may determine whether the transaction at issue is a candidate for a multi-user transaction. In the example of FIG. 2, the participation component has determined that the transaction at issue is a candidate for a multi-user transaction. In these examples, a payment options element 212 may include one or more payment options to satisfy a cost of the transaction for the items at issue. These payment options may include many types of options, but by way of example may include a pay by credit card option, a pay by stored account option, pay by installment option and a "multi-user" option 214 that corresponds to a multi-user transaction.

At step 204, when the primary user selects the multi-user option 214, the user interface 200 may be updated to include a selectable element that represents an option to find participants for the multi-user transaction. When selected, the user interface 200 may be caused to present functionality for the primary user, who is associated with a first user profile, to select one or more other user profiles associated with potential users to invite to participate in the transaction. User contacts data from the payment service, the payment application, the primary user's device, or any other source may be utilized to present potential user profiles to the primary user. In an example, selection of participants may be customized based on user preferences and characteristics of the item(s) in the transaction. In the concert ticket example above, the primary user may be able to identify which seat (or item or portion of item) is to be associated with which potential other user, prices for each potential other user, priority of potential other users, etc. In other examples, the payment service may determine what aspects of the transaction are to be associated with the various potential other users. In still other examples, these aspects may not be specified by the primary user or the payment service, but may ultimately be determined by the other users that opt into transaction participation. For example, the seats may be first come first served. In some examples, initiation of the transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated.

Once potential other users are identified, an interactive element component of the payment service may generate one or more interactive elements embedded with data that may be sent to devices of the potential other users. Each interactive element may be user specific, transaction specific, item specific, etc. For example, a given secondary user may receive an interactive element identifying a specific item to be assigned to the secondary user if the secondary user opts into the transaction. The interactive element may also indicate the condition to be satisfied for the transaction to proceed, such as an amount of time left to complete the transaction or for the potential other user to opt in. As such, generation of the interactive element may be dynamic and may change prior to completion of the transaction. In examples, the interactive element, when selected, may cause a payment application or other user interface to be enabled and to display functionality for receiving user input data indicating an intent to participate in the transaction, as well as, in examples, selection of details about the transaction to be assigned to the potential other user. Additional details on the interactive elements are provided with respect to FIG. 1.

Once other users have opted into the transaction and one or more conditions have been met, the payment service may facilitate processing of the transaction. The one or more conditions may include a threshold number of other users participating, determining that the users have funds available for the transaction, determining that details for the transaction have been provided such as seat assignments, etc. In examples, the user interface 200 utilized to select potential other users may be updated dynamically as the transaction proceeds. For example, the user interface 200 may be updated to indicate the selected potential other users and a status 216(a)-(b) for each user showing whether the user has opted into the transaction, whether a response is pending, etc. As shown at step 204, for "User B" the status 216(a) indicates that the system is still awaiting a response from this user as to whether the user wants to opt into the multi-user transaction. The status 216(b) indicates that the system has received user input data of "User C" indicating an intent to participate in the multi-user transaction.

At step 206, once the secondary users have opted in, the user interface 200 may be updated to include a transaction status indicator 218. In the example of FIG. 2, the transaction status indicator 218 is that the transaction at issue has been completed. This indicates that secondary participants elected to join the transaction and that either a payment stage of the transaction has been initiated or has been completed. Details about the transaction may also be provided via the user interface 200, such as item details 220. The item details 220 may indicate which item or item portion has been attributed to a given user in the multi-user transaction. In FIG. 2, the item details 220 indicate that User A has been associated with Item A, User B has been associated with Item B, and User C has been associated Item C.

Additionally, the user interface 200 may include installment information 222. The installment information may indicate an amount of funds paid up front as an initial installment in an installment plan, here $50 in FIG. 2. Additionally, the installment information 222 may include an amount of funds still remaining to be paid, here $150 in FIG. 2. Furthermore, the installment information 222 may include an indicator of future amounts due and the dates on which those payments are due.

Figure 3A:
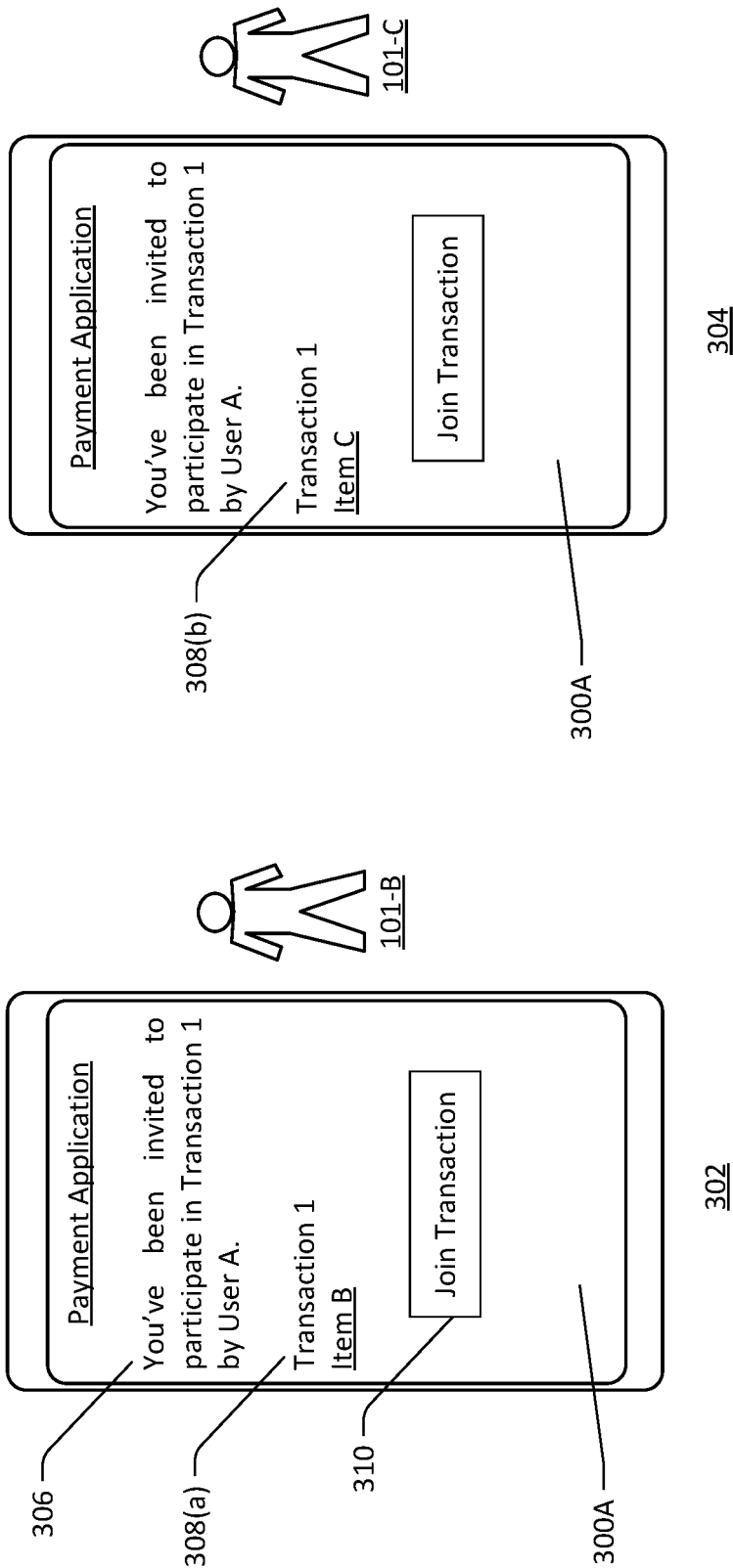
FIG. 3A is an example user interface displayed on an example user device, where the user interface is configured to present interactive elements to potential participants in a multi-user transaction, according to an embodiment described herein.

FIG. 3A is an example user interface 300A displayed on an example secondary user device 103, where the user interface 300A is configured to present interactive elements to potential participants in a multi-user transaction, according to an embodiment described herein. The user interface 300A may be the same or similar to one or more of the user interfaces 120 described with respect to FIG. 1.

In examples, the user interface 300A may be presented in association with a merchant ecommerce website, within a payment application such as the payment application 122 described with respect to FIG. 1, or any other application or interface associated with communication functionality such as emails, messaging applications, etc. For example, the payment application may reside on the secondary user device 103, and when data representing the interactive elements described herein is received at the secondary user device 103, the data may cause the user interface 300A to surface or may cause the payment application to enable and be presented in a foreground of the secondary user device 103.

At step 302, the user interface 300A may be caused to display an explanation 306 associated with the interactive element. The explanation 306 may include text data, image data, and the like that provides a potential secondary user 101-B with an indication that the potential secondary user 101-B has been invited to participate in a multi-user transaction, as well as details about the transaction, who the primary user is, when item(s) have been attributed to the potential secondary user 101-B, other invitees, etc. Additionally, transaction details 308(a) may be presented in the user interface 300A and may allow the potential secondary user 101-B to see additional details about the items at issue. The transaction details 308(a), or a portion thereof, may include a link that, when selected, may cause the user interface 300 to display the merchant website associated with the item(s) at issue. Additionally, the user interface 300A may include a "join transaction" option 310 or otherwise a selectable element to provide user input data to for opting into the multi-user transaction. In some examples, the option 310 can comprise a QR code, a barcode, a deep link, or other interactive element.

At step 304, which should not be construed as necessarily occurring after step 302, may include causing the user interface 300A to display similar information on another device of another potential secondary user 101-C. In this example, the primary user 101-A has invited two potential secondary users 101-B, 101-C to participate in the same multi-user transaction. As shown at step 304, the item details 308(b) may be different from the item details 308(a) as shown in step 302. By so doing, the interactive elements described herein may be user specific, item specific, transaction specific, merchant specific, etc. and may be generated on-the-fly based on the multi-user transaction at issue. In this example, the potential secondary user 101-B has been associated with Item B, while the potential secondary user 101-C has been associated with Item C.

Figure 3B:
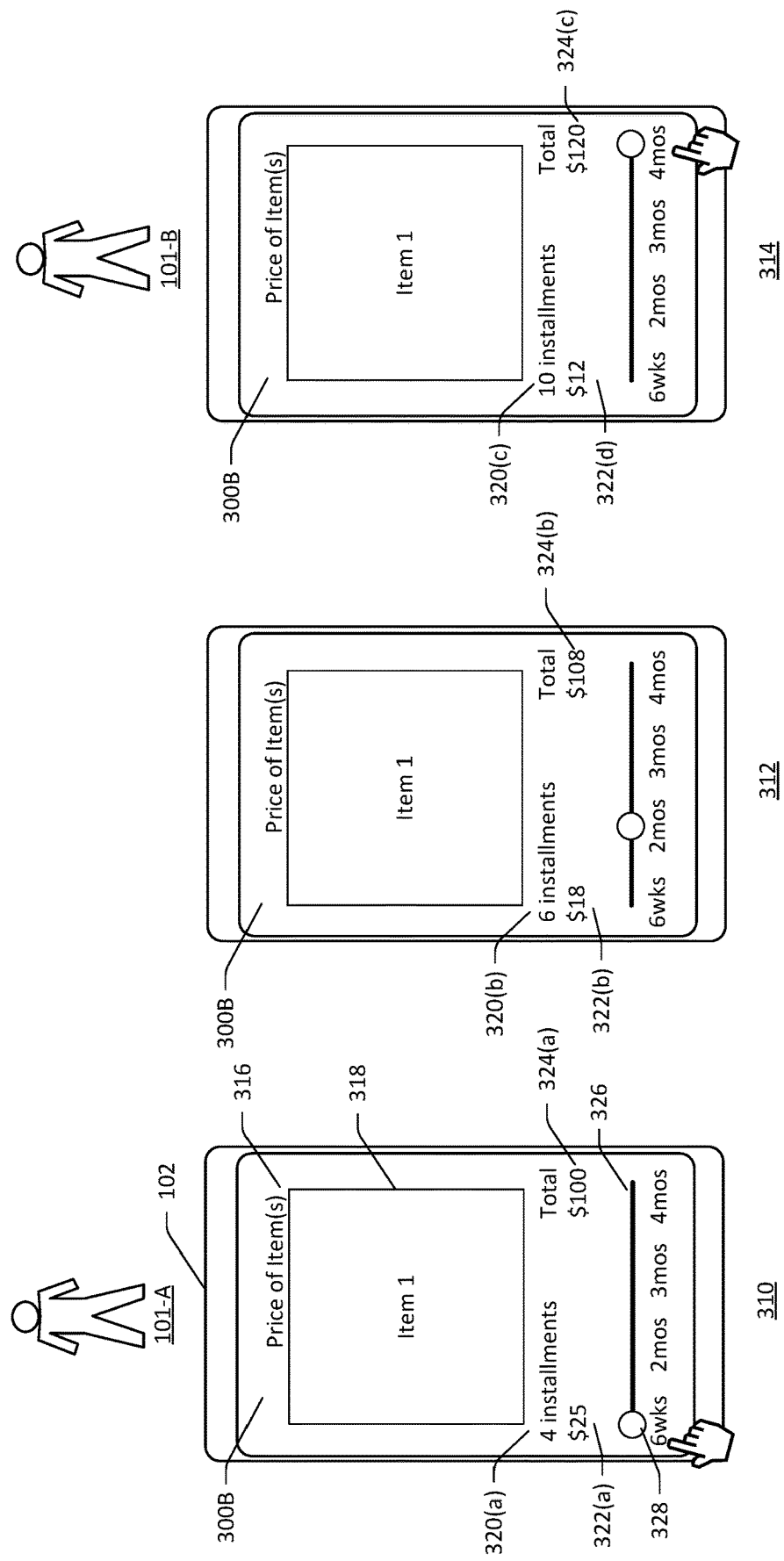
FIG. 3B is an example user interface displayed on an example user device, where the user interface is configured to present installment plan options for multi-user transactions, according to an embodiment described herein.

FIG. 3B is an example user interface 300B displayed on an example user device, where the user interface 300B is configured to present installment plan options for multi-user transactions, according to an embodiment described herein. The user interface 300B may be the same or similar to one or more of the user interfaces 120 described with respect to FIG. 1.

As shown in FIG. 3B, at step 310, the user interface 300B may display functionality to allow for the selection of one or more payment installment plans to be utilized to satisfy a cost of a multi-user transaction for one or more items as described herein. The user interface 300B may include an advertised price 316 of the item(s) at issue as provided by the merchant that is selling the item. Note that the advertised price 316 may remain constant even as different installment plans are reviewed and chosen. The user interface 300B may also include item information 318, which may include text or images of the item(s) at issue. Here, again, the item information 318 may remain constant even as different installment plans are reviewed and chosen.

The user interface 300B may also include installment number indicators 320(a)-(c), which may indicate, for various installment plan options, the number of installments for those options. As shown in FIG. 3B, at step 310 the installment number indicator 320(a) indicates the installment plan at issue has "4" installments, at step 312 the installment number indicator 320(b) indicates the installment plan at issue has "6" installments, and at step 314 the installment number indicator 320(c) indicates the installment plan at issue has "10" installments. Additionally, the user interface 300B may indicate a per-installment amount 322(a)-(c) associated with the various installment plan options. As shown in FIG. 3B, at step 310, the per-installment amount 322(a) indicates the installment plan at issue would require a per-installment payment of $25 over four installments, at step 312 the per-installment amount 322(b) indicates the installment plan at issue would require a per-installment payment of $18 over six installments, and at step 314 the per-installment amount 322(c) indicates the installment plan at issue would require a per-installment payment of $12 over ten installments. Additionally, a total price 324(a)-(c) may also be displayed that indicates a total cost of the installment plan, if implemented. At step 310, if selected, the installment plan would require only four installments with each at a higher amount than the other options displayed in FIG. 3B. In this example, the total price 324(a) for this installment plan would be $100. At step 312, if selected, the installment plan would require six installments with each at a lower amount than the option at step 310. In this example, given that the funds for payment of the item would not be received until later than if the installment plan at step 310 were chosen, the total price 324(b) may be more than the total price 324(a) from step 310. In the example of step 312, the six-installment plan may require a per-installment amount 322(b) of $18 and a total price 324(b) of $108. A similar process may be performed with respect to step 314, where the total price 324(c) may be for $120 given that ten installments will be made.

In addition to the above, the user interface 300B may include a timing scale 326, which may present options for an amount of time over which installments will be made to satisfy a cost of the transaction. The timing scale 326 in FIG. 3B shows options ranging from six weeks to four months. It should be understood, however, that the timing scale 326 may include any period(s) of time or another variable (e.g., amount per installment, etc.). The user interface 300B may also include a slider element 328, which may be manipulated by the user to select an amount of time on the timing scale 326. As shown in FIG. 3B, the shorter the amount of time that is selected, the less expensive the total price 324(a)-(c) will be and the fewer installments there will be. The longer the amount of time that is selected, the more expensive the total price 324(a)-(c) will be and the more installments there will be.

Figure 6A:
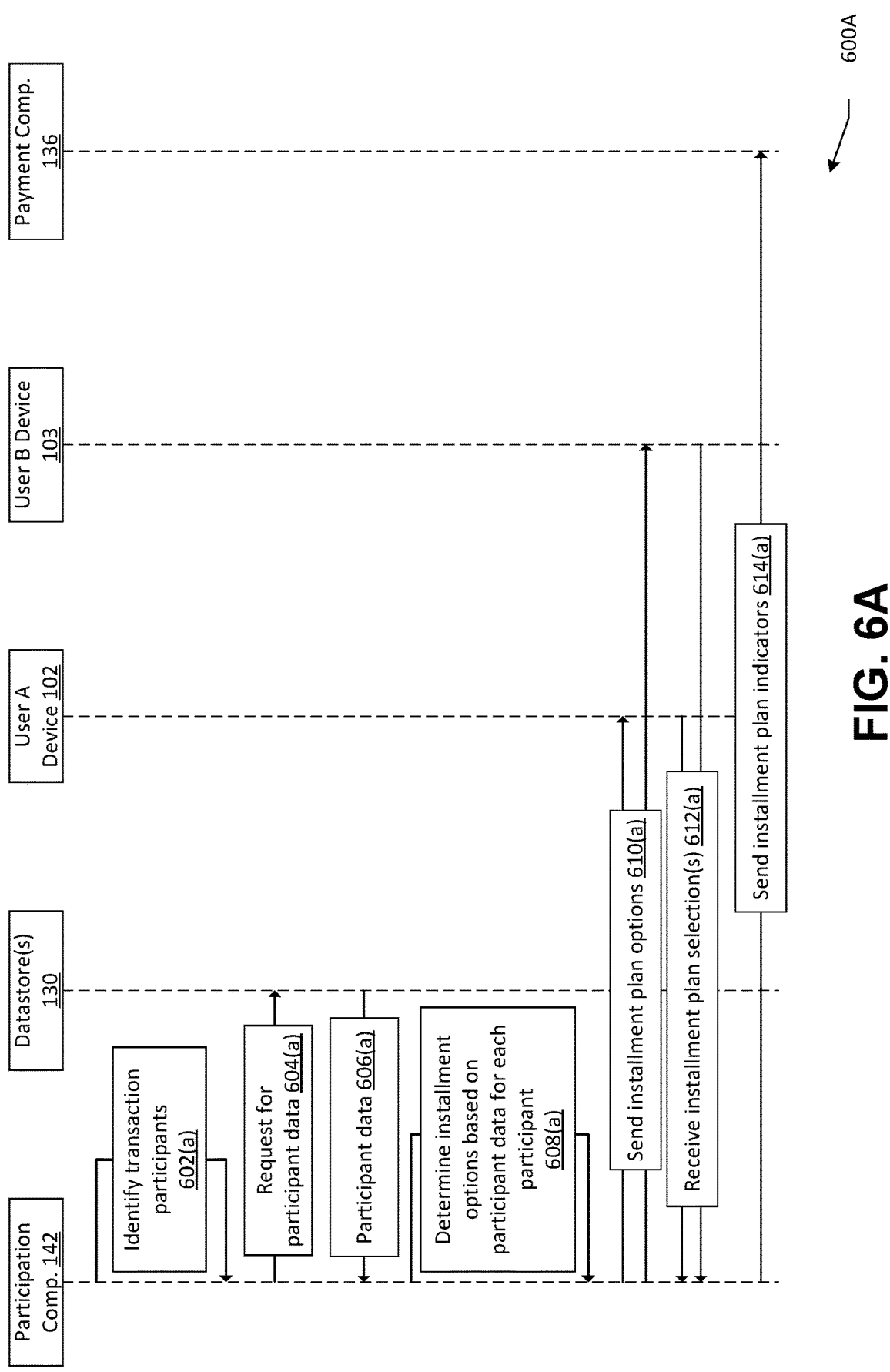
FIG. 6A is a sequence diagram showing an example process for determining installment plan options for payment of a multi-user transaction, according to an embodiment described herein.

With respect to FIG. 3B, in a multi-user transaction, each user may select their own installment plan (as described with respect to FIG. 6B), or an installment plan may be selected with respect to the transaction at issue (as described with respect to FIG. 6A). As such, the same installment plan may be presented to all of the users in a multi-user transaction, or each user may be presented with a potentially different installment plan. This may allow for presentation of dynamic installment plans based on the users at issue, the transaction at issue, etc. Additionally, how the multiple users pay for given installments may be configurable. More details on configurability of installment payments is provided with respect to FIGS. 7A and 7B, below.

FIGS. 4A-9 are example processes for integration of multi-user interactions using data linkage. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3B and 10-14, although the processes may be implemented in a wide variety of other environments, architectures and systems.

Figure 4A:
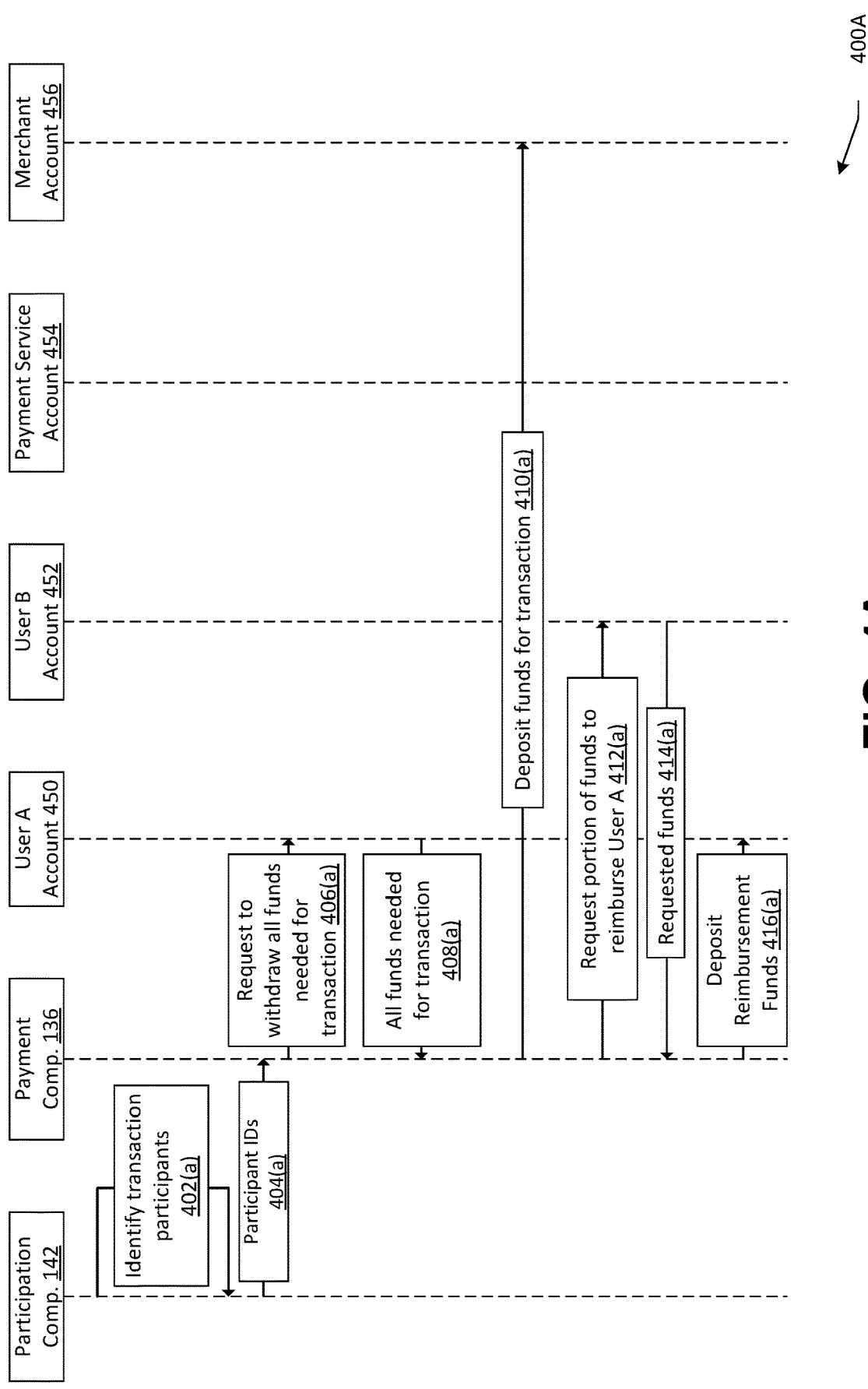
FIG. 4A is a sequence diagram showing an example process for providing funds to a merchant for a multi-user transaction, according to an embodiment described herein.

FIG. 4A is a sequence diagram showing an example process 400A for providing funds to a merchant for a multi-user transaction, according to an embodiment described herein. The process 400A may utilize one or more components described with respect to FIG. 1. For example, the process 400A may include the use of a participation component 142 and a payment component. Additionally, the process 400A may utilize one or more accounts, such as the accounts 134 described with respect to FIG. 1, including a primary user account denoted as User A account 450, a secondary user account denoted as User B account 452, a payment service account 454, and a merchant account 456. The processes described with respect to FIG. 4A are presented sequentially from blocks 402(a) to 416(a). However, it should be understood that the processes need not be performed in the order represented in FIG. 4A and that at least some of the processes may be performed in parallel with other processes.

At step 402(a), the participation component 142 may identifying transaction participants for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 404(a), the participation component 142 may send participant identifiers to the payment component 136. The participant identifier may include an indication of the user profiles associated with the users that are participating in the multi-user transaction. In this example, the participant identifier may identify User A and User B as the users associated with the multi-user transaction.

At step 406(a), the payment component 136 may send a request to withdraw all funds needed for the transaction to the User A account 450. In this example, user preferences, the payment service, or account data associated with the users or the merchant may be utilized to determine that the primary user (here User A) is to initially provide all of the funds to satisfy payment for the transaction, and then funds will be deposited back into the User A account 450 at a later time. The request may cause the payment service to determine whether the User A account 450 has necessary funds to satisfy payment for the transaction.

In examples, the payment service may determine to withdraw all of the funds for the transaction from the primary user or one of the secondary users based at least in part on one or more factors. For example, the factors may include the amount of the transaction, creditworthiness of the users at issue, past transaction history of the users at issue, requirements or preferences associated with the users or the merchant, the items associated with the transaction, return policies associated with the merchant, or one or more other factors. In examples, the determination of whether to have one of the users initially provide all of the funds for the transaction at issue may be based at least in part on output from one or more machine learning models. A machine learning model may be configured to determine how likely it is that the users in a multi-user transaction will pay their share of the transaction. The machine learning model may be trained utilizing a training dataset that indicates results of prior transactions where a single user was selected to make the full initial payment. This trained machine learning model may be utilized to accept, as input, details associated with the transaction including the factors described above, and to output result data indicating whether a given user should be selected to fund the entire transaction initially, and reimbursement from other users in the transaction should occur.

At step 408(a), the User A account 450 may send the requested funds or an indication that such funds are available to the payment component 136, which may withdraw those funds from the User A account 450.

At step 410(a), the payment component 136 may deposit the funds received from the User A account 450 into the merchant account 456 to satisfy payment for the transaction. In examples, depositing the funds may be performed by the payment service or may be performed by one or more other services or systems configured to facilitate the transfer of funds between accounts.

At step 412(a), the payment component 136 may send a request to the User B account 452 for a portion of the funds attributable to User B as reimbursement for User A. This process may be performed in the same or a similar manner as described with respect to step 406(a), above.

At step 414(a), the User B account 452 may send the requested funds or an indication that such funds are available to the payment component 136, which may withdraw those funds from the User B account 452.

At step 416(*a*), the payment component 136 may deposit the funds received from the User B account 452 into the User A account 450 as reimbursement for the funds User A provided to the merchant account 456. Note that in this example where User A initially provides all the funds to satisfy payment for the transaction, the payment service account 454 may not be utilized, or in other words deposits may not be made and funds may not be withdrawn from the payment service account 454 in this example.

Figure 4B:
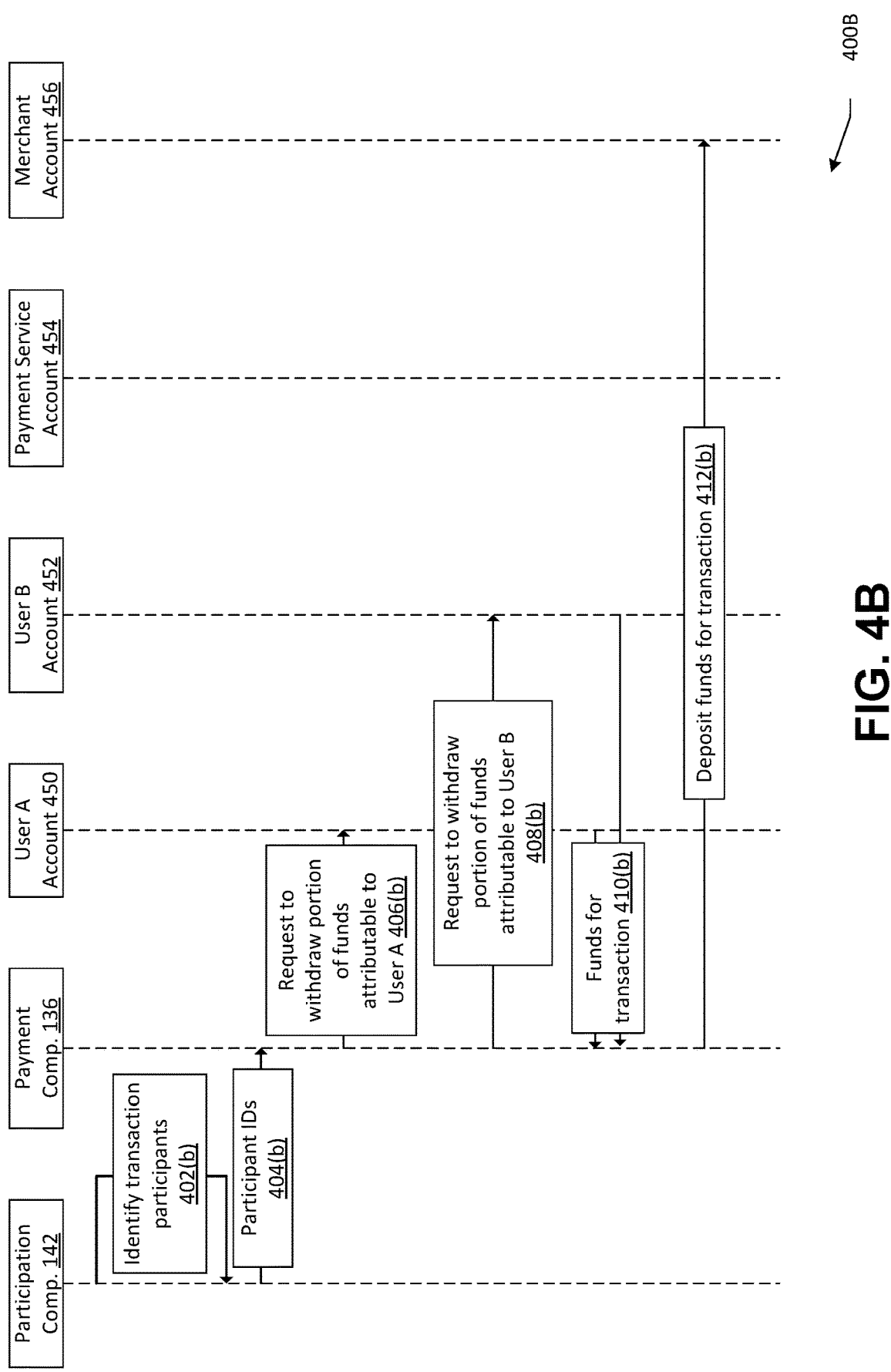
FIG. 4B is a sequence diagram showing another example process for providing funds to a merchant for a multi-user transaction, according to an embodiment described herein.

FIG. 4B is a sequence diagram showing another example process 400B for providing funds to a merchant for a multi-user transaction, according to an embodiment described herein. The process 400B may utilize one or more components described with respect to FIG. 1. For example, the process 400B may include the use of a participation component 142 and a payment component. Additionally, the process 400B may utilize one or more accounts, such as the accounts 134 described with respect to FIG. 1, including a primary user account denoted as User A account 450, a secondary user account denoted as User B account 452, a payment service account 454, and a merchant account 456. The processes described with respect to FIG. 4B are presented sequentially from blocks 402(*b*) to 412(*b*). However, it should be understood that the processes need not be performed in the order represented in FIG. 4B and that at least some of the processes may be performed in parallel with other processes.

At step 402(*b*), the participation component 142 may identifying transaction participations for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 404(*b*), the participation component 142 may send participant identifiers to the payment component 136. The participant identifier may include an indication of the user profiles associated with the users. In this example, the participant identifier may identify User A and User B as the users associated with the multi-user transaction.

At step 406(*b*), the payment component 136 may send a request to withdraw a portion of the funds attributable to User A to the User A account 450. In this example, user preferences, the payment service, or account data associated with the users or the merchant may be utilized to determine that the primary user (here User A) is to provide only a portion of the total funds needed to satisfy payment of the transaction and the secondary user (here User B) is to provide another portion of the total funds. The request may cause the payment service to determine whether the User A account 450 has necessary funds to satisfy payment for the requested funds.

In examples, the payment service may determine to withdraw apportioned funds from the primary user and the secondary user(s) based at least in part on one or more factors. For example, the factors may include the amount of the transaction, creditworthiness of the users at issue, past transaction history of the users at issue, requirements or preferences associated with the users or the merchant, the items associated with the transaction, return policies associated with the merchant, or one or more other factors. In examples, the determination of whether to withdraw apportioned funds may be based at least in part on output from one or more machine learning models. A machine learning model may be configured to determine how likely it is that the users in a multi-user transaction will pay their share of the transaction. The machine learning model may be trained utilizing a training dataset that indicates results of prior transactions where apportioned fund withdrawal was selected to make the payment for those transactions. This trained machine learning model may be utilized to accept, as input, details associated with the transaction including the factors described above, and to output result data indicating whether apportioned fund withdrawal should be selected to fund the transaction.

At step 408(*b*), the payment component 136 may send a request to the User B account 452 for a portion of the funds attributable to User B. This process may be performed in the same or a similar manner as described with respect to step 406(*b*), above.

At step 410(*b*), the User A account 450 and the User B account 452 may send the requested funds or an indication that such funds are available to the payment component 136, which may withdraw those funds from the User A account 450 and the User B account 452.

At step 412(*b*), the payment component 136 may deposit the funds received from the User A account 450 and the User B account 452 into the merchant account 456 to satisfy payment for the transaction. In examples, depositing the funds may be performed by the payment service or may be performed by one or more other services or systems configured to facilitate the transfer of funds between accounts. Note that in this example where fund apportionment across the users at issue is utilized to satisfy payment for the transaction, the payment service account 454 may not be utilized, or in other words deposits may not be made and funds may not be withdrawn from the payment service account 454 in this example.

Figure 4C:
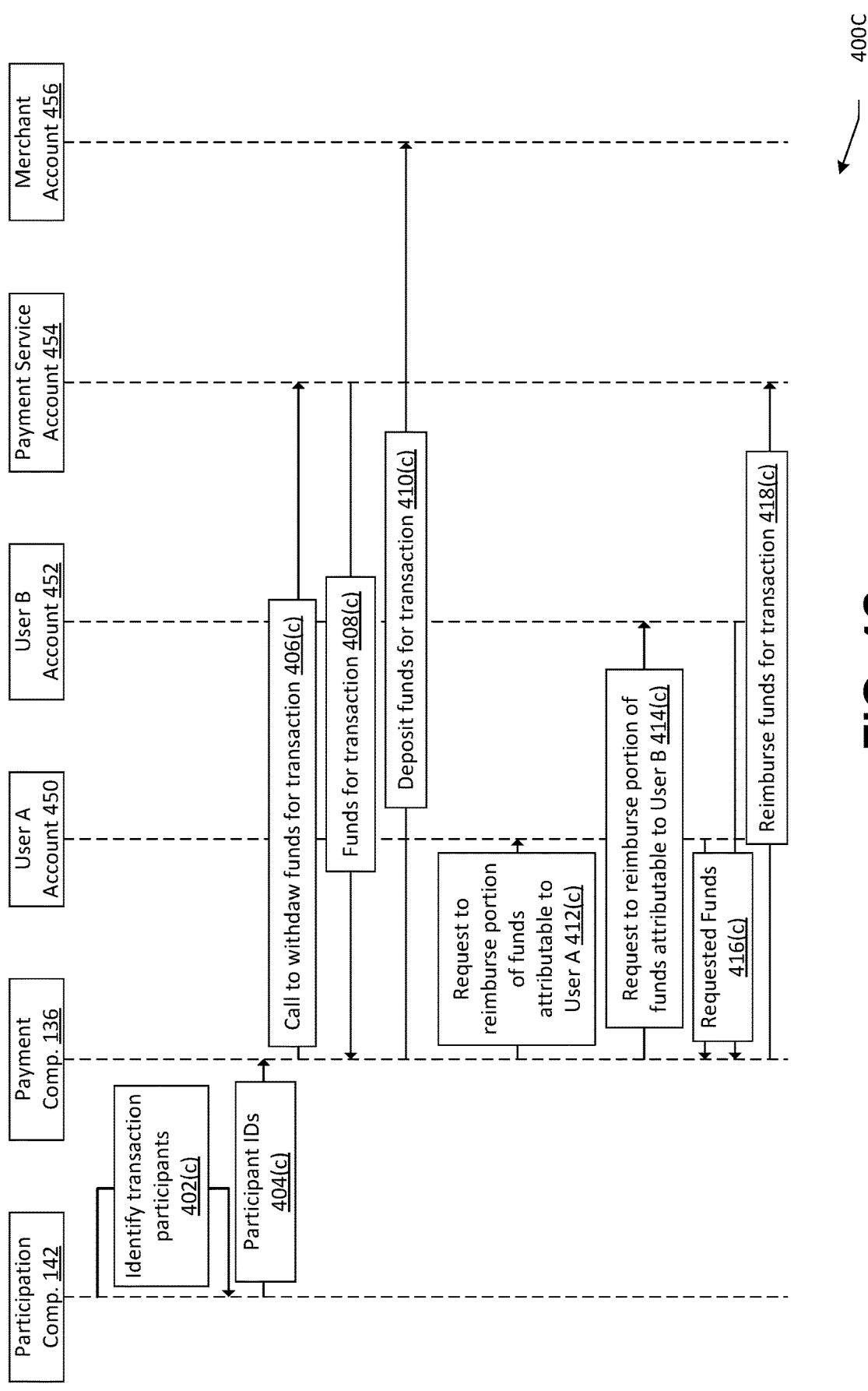
FIG. 4C is a sequence diagram showing yet another example process for providing funds to a merchant for a multi-user transaction, according to an embodiment described herein.

FIG. 4C is a sequence diagram showing yet another example process 400C for providing funds to a merchant for a multi-user transaction, according to an embodiment described herein. The process 400C may utilize one or more components described with respect to FIG. 1. For example, the process 400C may include the use of a participation component 142 and a payment component. Additionally, the process 400C may utilize one or more accounts, such as the accounts 134 described with respect to FIG. 1, including a primary user account denoted as User A account 450, a secondary user account denoted as User B account 452, a payment service account 454, and a merchant account 456. The processes described with respect to FIG. 4C are presented sequentially from blocks 402(*c*) to 418(*c*).

However, it should be understood that the processes need not be performed in the order represented in FIG. 4C and that at least some of the processes may be performed in parallel with other processes.

At step 402(*c*), the participation component 142 may identifying transaction participations for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 404(*c*), the participation component 142 may send participant identifiers to the payment component 136. The participant identifier may include an indication of the user profiles associated with the users. In this example, the participant identifier may identify User A and User B as the users associated with the multi-user transaction.

At step 406(c), the payment component 136 may send a call to request funds for the transaction to the payment service account 454. In this example, user preferences, the payment service, or account data associated with the users or the merchant may be utilized to determine that the payment service is to provide all of the funds to satisfy payment of the transaction and the primary user (here User A) and the secondary user (here User B) are to reimburse the payment service for funds attributable to those users.

In examples, the payment service may determine to provide initial funds for the transaction based at least in part on one or more factors. For example, the factors may include the amount of the transaction, creditworthiness of the users at issue, past transaction history of the users at issue, requirements or preferences associated with the users or the merchant, the items associated with the transaction, return policies associated with the merchant, or one or more other factors. In examples, the determination of whether to have the payment service provide the initial funds may be based at least in part on output from one or more machine learning models. A machine learning model may be configured to determine how likely it is that the users in a multi-user transaction will pay their share of the transaction. The machine learning model may be trained utilizing a training dataset that indicates results of prior transactions where the payment service was selected to make the initial payment for those transactions. This trained machine learning model may be utilized to accept, as input, details associated with the transaction including the factors described above, and to output result data indicating whether the payment service should be selected to fund the transaction initially.

At step 408(c), the payment service account 454 may send the requested funds or an indication that such funds are available to the payment component 136, which may withdraw those funds from the payment service account 454.

At step 410(c), the payment component 136 may deposit the funds received from the payment service account 454 into the merchant account 456 to satisfy payment for the transaction. In examples, depositing the funds may be performed by the payment service or may be performed by one or more other services or systems configured to facilitate the transfer of funds between accounts.

At step 412(c), the payment component 136 may send a request to the User A account 450 for a portion of the funds attributable to User A as reimbursement to the payment service. The request may cause the payment service to determine whether the User A account 450 has necessary funds to satisfy payment for the transaction.

At step 414(c), the payment component 136 may send a request to the User B account 452 for a portion of the funds attributable to User B. This process may be performed in the same or a similar manner as described with respect to step 412(c), above.

At step 416(c), the User A account 450 and the User B account 452 may send the requested funds or an indication that such funds are available to the payment component 136, which may withdraw those funds from the User A account 450 and the User B account 452.

At step 418(c), the payment component 136 may deposit the funds received from the User A account 450 and the User B account 452 into payment service account 454 as reimbursement for the funds the payment service provided to the merchant account 456.

FIG. 5 is a flow diagram of an example process for identifying characteristics of item(s) for use in generating user-specific interactive elements, according to an embodiment described herein. The order in which the operations or steps are described is not intended to be construed as a limitation, and any number of the described operations may be combined in any order and/or in parallel to implement process 500.

At block 502, the process 500 may include receiving an indication of a request for a transaction with multiple users. For example, a primary user may provide user input data indicating an intent to initiate a transaction. This input data may be received at a user interface associated with an ecommerce website associated with a merchant, a POS terminal physically located at a merchant location, in association with a payment application associated with the payment service, etc. In certain examples, the transaction may not be a candidate for multiple users participating therein, such as when the primary user is buying a shirt, is scheduling an oil change, etc. However, in other transactions, a condition is to be satisfied for the transaction to be completed successfully. In examples, the condition may be a time window for purchasing the item(s). In these and other examples, the payment service may be configured to identify, for a given transaction, that the transaction includes the condition to be satisfied and that the transaction is for the purchase of multiple items or for an item that has multiple portions. In other examples, given merchants or merchant categories may be identified that are associated with items that may be purchased as a multi-user transaction. Identification of the merchants, merchant categories, or conditions to be satisfied may be performed utilizing machine learning techniques, as described more fully below with respect to FIG. 9.

Once a transaction is identified as a potential multi-user transaction, the user interface presented to the primary user may be updated, customized, or otherwise to include a selectable element that represents an option to find participants for the multi-user transaction. When selected, the user interface may be caused to present functionality for the primary user, who is associated with a first user profile, to select one or more other user profiles associated with potential users to invite to participate in the transaction. User contacts data from the payment service, the payment application, the primary user's device, or any other source may be utilized to present potential user profiles to the primary user. In an example, selection of participants may be customized based on user preferences and characteristics of the item(s) in the transaction. In the concert ticket example above, the primary user may be able to identify which seat (or item or portion of item) is to be associated with which potential other user, prices for each potential other user, priority of potential other users, etc. In other examples, the payment service may determine what aspects of the transaction are to be associated with the various potential other users. In still other examples, these aspects may not be specified by the primary user or the payment service, but may ultimately be determined by the other users that opt into transaction participation. For example, the seats may be first come first served. In some examples, initiation of the transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated.

At block 504, the process 500 may include analyzing data associated with one or more items in the transaction. For example, the data may include descriptions of the item(s) at issue, metadata associated with the item(s) at issue, an indicator of a number of given item(s) in a "cart" of a merchant website or otherwise, a cost of the item(s), etc.

At block 506, the process 500 may include determining whether a single item with multiple portions is involved in the transaction. For example, the payment service may be configured to determine, initially, whether the transaction includes just one item based on the analysis described at block 504. Thereafter, when only a single item is involved in the transaction, the data analysis may indicate whether the single item has multiple portions. For example, a transaction involving the purchase of a single shirt would not be considered to have multiple portions. To the contrary, a transaction for the rental of a vacation property with multiple rooms may be considered to have multiple portions when data associated with the vacation property indicates the property has multiple rooms, is advertised as being capable of "sleeping" multiple people, etc. The same may be true for transactions involving multiple concert tickets, airplane tickets, etc.

In examples where the transaction has a single item with multiple portions, the process 500 may include, at block 508, identifying portions of the item. The data analysis described above may include not just determining that the item at issue includes multiple portions, but also may determine how many portions the item is associated with.

At block 510, the process 500 may include assigning a monetary amount to the portions. For example, the payment service may be configured to determine a total price for the item at issue, such as a total price for rental of a vacation property for a stated length of stay. Say, for example, that the transaction involved rental of a vacation property for two nights at a total price of $2,000. The payment service may determine that the vacation property has three bedrooms, one noted as a master suite, one noted as a bedroom with a twin-sized bed, and another noted as a bedroom with a king-sized bed. The payment service may be configured to identify, from textual analysis of these descriptions and utilizing a set of rules predetermined to indicate item quality, that the master suite should be assigned a first value, the bedroom with the twin-sized bed should be assigned a second value that is less than the first value, and the bedroom with the queen-sized bed should be assigned a third value that is less than the second value.

At block 512, the process 500 may include generating interactive elements indicating portions of the items and monetary amounts associated with the portions. For example, an interactive element component of the payment service may generate one or more interactive elements embedded with data that may be sent to devices of the potential other users. Each interactive element may be user specific, transaction specific, item specific, etc. For example, a given secondary user may receive an interactive element identifying a specific item to be assigned to the secondary user if the secondary user opts into the transaction. The interactive element may also indicate the condition to be satisfied for the transaction to proceed, such as an amount of time left to complete the transaction or for the potential other user to opt in. As such, generation of the interactive element may be dynamic and may change prior to completion of the transaction. In examples, the interactive element, when selected, may cause a payment application or other user interface to be enabled and to display functionality for receiving user input data indicating an intent to participate in the transaction, as well as, in examples, selection of details about the transaction to be assigned to the potential other user. Additional details on the interactive elements are provided with respect to FIG. 1.

As shown in FIG. 5, in this example, the interactive element for a potential secondary user associated with the twin-sized bedroom may indicate the second price while the interactive element for the potential secondary user associated with the queen-sized bedroom may indicate the third price.

Returning to block 506, in examples where the transaction does not include a single item with multiple portions, the process 500 may include, at block 514, determining whether the transaction includes multiple items. The data analysis described above with respect to block 504 may be utilized to determine if the transaction includes multiple items.

In examples where the transaction does not involve multiple items, the process 500 may include, at block 516, requesting user input data on item details for the item in the transaction. In these examples, the payment service may have determined that the transaction is a candidate for a multi-user transaction, but not to a degree of confidence that satisfies a confidence threshold for displaying that option to a user. In other examples, the user may have indicated a desire to initiate a multi-user transaction but the payment service may not have determined to a threshold confidence level whether the transaction includes multiple items. In these and other examples, instead of ending the process, the payment service may present an option for the primary user to provide input data on how many items are in the transaction or what item portions there are.

At block 518, the process 500 may include generating one or more interactive elements based on the user input data. Generation of the interactive elements may be performed in the same or a similar manner as described with respect to block 512, above.

Returning to block 514, in examples where the transaction involves multiple items, the process 500 may include, at block 520, determining a monetary amount for each item. Determining the monetary amount may be performed in the same or a similar manner as described above with respect to block 510.

At block 522, the process 500 may include generating interactive elements indicating the items in the transaction and the monetary amounts. Generation of the interactive elements may be performed in the same or a similar manner as described above with respect to block 512.

FIG. 6A is a sequence diagram showing an example process 600A for determining installment plan options for payment of a multi-user transaction, according to an embodiment described herein. The process 600A may utilize one or more components described with respect to FIG. 1. For example, the process 600A may include the use of a participation component 142, one or more datastores 130, a primary user device (denoted as the User A primary user device 102), a secondary user device (denoted as the User B secondary user device 103), and a payment component 136. The processes described with respect to FIG. 6A are presented sequentially from blocks 602(a) to 614(a). However, it should be understood that the processes need not be performed in the order represented in FIG. 6A and that at least some of the processes may be performed in parallel with other processes.

At step 602(a), the participation component 142 may identify transaction participants for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 604(a), the participation component 142 may send a request for participant data to the one or more datastores 130. The participant data may include any data associated with the participants of the transaction at issue, including user data associated with the users, merchant data associated with the merchant at issue, prior user data indicating attributes of past transactions, etc.

At step 606(a), the datastores 130 may send the participant data to the participation component 142, such as in response to the request for such information from the participation component 142.

At step 608(a), the participation component 142 may determine payment installment options to provide to the users at issue based at least in part on the participant data for each of the participants, here being User A and User B. For example, one or more payment installment plan options may be surfaced to the users in the multi-user transaction. Typically, a payment installment plan provides a user with the option to pay for an item or items over time, making predefined partial payments over a certain number of installments (e.g., four monthly payments of $25 for a $100 item). In the multi-user transactions described herein, the payment installment plans may differ. For example, a first installment plan option may be presented to one of the users while a second, different installment plan option may be presented to another of the users in the same multi-user transaction. The payment service may determine which of multiple potential installment plans are to be presented as options to a given user based at least in part on participant data for the user(s), prior transaction data, transaction data associated with the current transaction, user preferences, etc. By so doing, the payment service may determine user-specific installment plan options on-the-fly prior to conclusion of the transaction at issue. This may provide potential users with needed information to determine whether to opt into the transaction in a way that could not be performed absent the time sensitive, on-the-fly determinations described herein. In examples, identification of installment plans as options for a given user may be based at least in part on machine learning techniques as described more fully herein.

In the example of FIG. 6A, the installment plan options that have been selected as options are determined based on the participant data for all the users at issue in the transaction, and those options are presented equally to each of the users.

At step 610(a), the participation component 142 may send the selected installment plan options to the User A primary user device 102 and the User B secondary user device 103. A user interface may be caused to display the installment plan options on the User A primary user device 102 and the User B secondary user device 103, such as through the payment application as described herein.

At step 612(a), the User A primary user device 102 and the User B secondary user device 103 may send an indication of a selected payment installment option to the participation component 142. In examples, the installment option selected by User A on the User A primary user device 102 may be the same as the installment option selected by User B on the User B secondary user device 103. In other examples, the installment options that are selected as between User A and User B may differ.

At step 614(a), the participation component 142 may send an indication of the selected installment plan option(s) to the payment component 136. The payment component 136 may store the indications of the selected installment plan(s), and may utilize these indications to determine when and how to withdraw funds from accounts associated with User A and User B. By so doing, even though a single multi-user transaction has occurred, each user in the transaction may be presented with installment plan options that are appropriate for them, and each user may select different installment plan options in a customized installment plan environment.

Figure 6B:
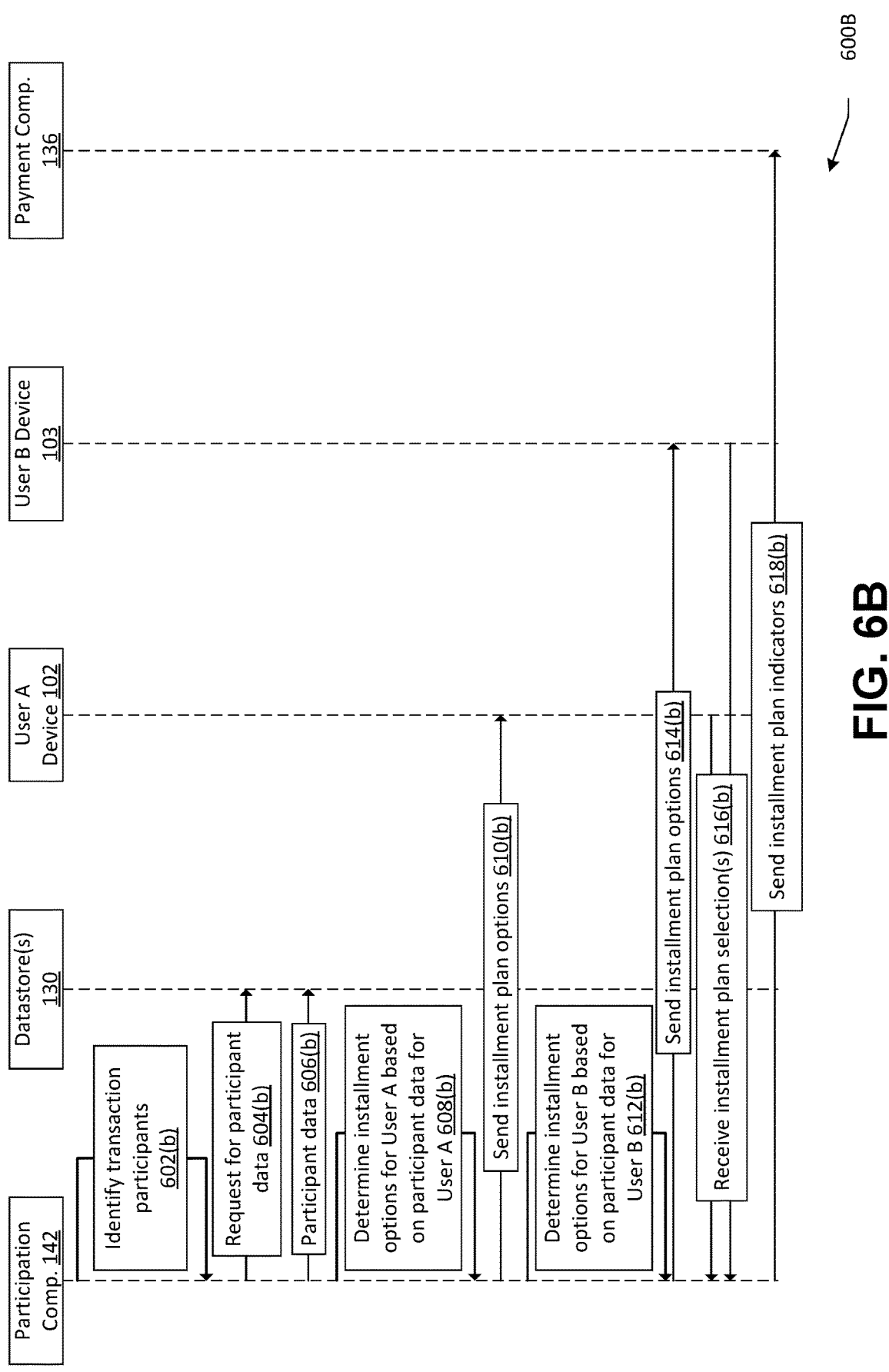
FIG. 6B is a sequence diagram showing another example process for determining installment plan options for payment of a multi-user transaction, according to an embodiment described herein.

FIG. 6B is a sequence diagram showing another example process 600B for determining installment plan options for payment of a multi-user transaction, according to an embodiment described herein. The process 600B may utilize one or more components described with respect to FIG. 1. For example, the process 600B may include the use of a participation component 142, one or more datastores 130, a primary user device (denoted as the User A primary user device 102), a secondary user device (denoted as the User B secondary user device 103), and a payment component 136. The processes described with respect to FIG. 6B are presented sequentially from blocks 602(b) to 618(b). However, it should be understood that the processes need not be performed in the order represented in FIG. 6B and that at least some of the processes may be performed in parallel with other processes.

At step 602(b), the participation component 142 may identify transaction participants for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 604(b), the participation component 142 may send a request for participant data to the one or more datastores 130. The participant data may include any data associated with the participants of the transaction at issue, including user data associated with the users, merchant data associated with the merchant at issue, prior user data indicating attributes of past transactions, etc.

At step 606(b), the datastores 130 may send the participant data to the participation component 142, such as in response to the request for such information from the participation component 142.

At step 608(b), the participation component 142 may determine payment installment options to provide to one of the users, for example User A at step 608(b). For example, one or more payment installment plan options may be surfaced to the users in the multi-user transaction. Typically, a payment installment plan provides a user with the option to pay for an item or items over time, making predefined partial payments over a certain number of installments (e.g., four monthly payments of $25 for a $100 item). In the multi-user transactions described herein, the payment installment plans may differ. For example, a first installment plan option may be presented to one of the users while a second, different installment plan option may be presented to another of the users in the same multi-user transaction. The payment service may determine which of multiple potential installment plans are to be presented as options to a given user based at least in part on participant data for the user(s), prior transaction data, transaction data associated with the current transaction, user preferences, etc. By so doing, the payment service may determine user-specific installment plan options on-the-fly prior to conclusion of the transaction at issue. This may provide potential users with needed information to determine whether to opt into the transaction in a way that could not be performed absent the time sensitive, on-the-fly determinations described herein. In examples, identification of installment plans as options for a given user may be based at least in part on machine learning techniques as described more fully herein.

In the example of FIG. 6B, the installment plan options that have been selected as options are determined based on the participant data for just the user at issue (say User A for example) or all the users at issue in the transaction, and those options are presented to specific users.

At step 610(b), the participation component 142 may send the selected installment plan options to the User A primary user device 102. A user interface may be caused to display the installment plan options on the User A primary user device 102, such as through the payment application as described herein.

At step 612(b), the participation component 142 may determine installment plan options for User B based on the participant data for User B. Selection of the installment plan options for User B may be performed in the same or a similar manner as described with respect to step 608(b).

At step 614(b), the participation component 142 may send the selected installment plan options to the User B secondary user device 103. A user interface may be caused to display the installment plan options on the User B secondary user device 103, such as through the payment application as described herein.

At step 616(b), the User A primary user device 102 and the User B secondary user device 103 may send an indication of a selected payment installment option to the participation component 142. In examples, the installment option selected by User A on the User A primary user device 102 may be the same as the installment option selected by User B on the User B secondary user device 103. In other examples, the installment options that are selected as between User A and User B may differ.

At step 618(b), the participation component 142 may send an indication of the selected installment plan option(s) to the payment component 136. The payment component 136 may store the indications of the selected installment plan(s), and may utilize these indications to determine when and how to withdraw funds from accounts associated with User A and User B. By so doing, even though a single multi-user transaction has occurred, each user in the transaction may be presented with installment plan options that are appropriate for them, and each user may select different installment plan options in a customized installment plan environment.

Figure 7A:
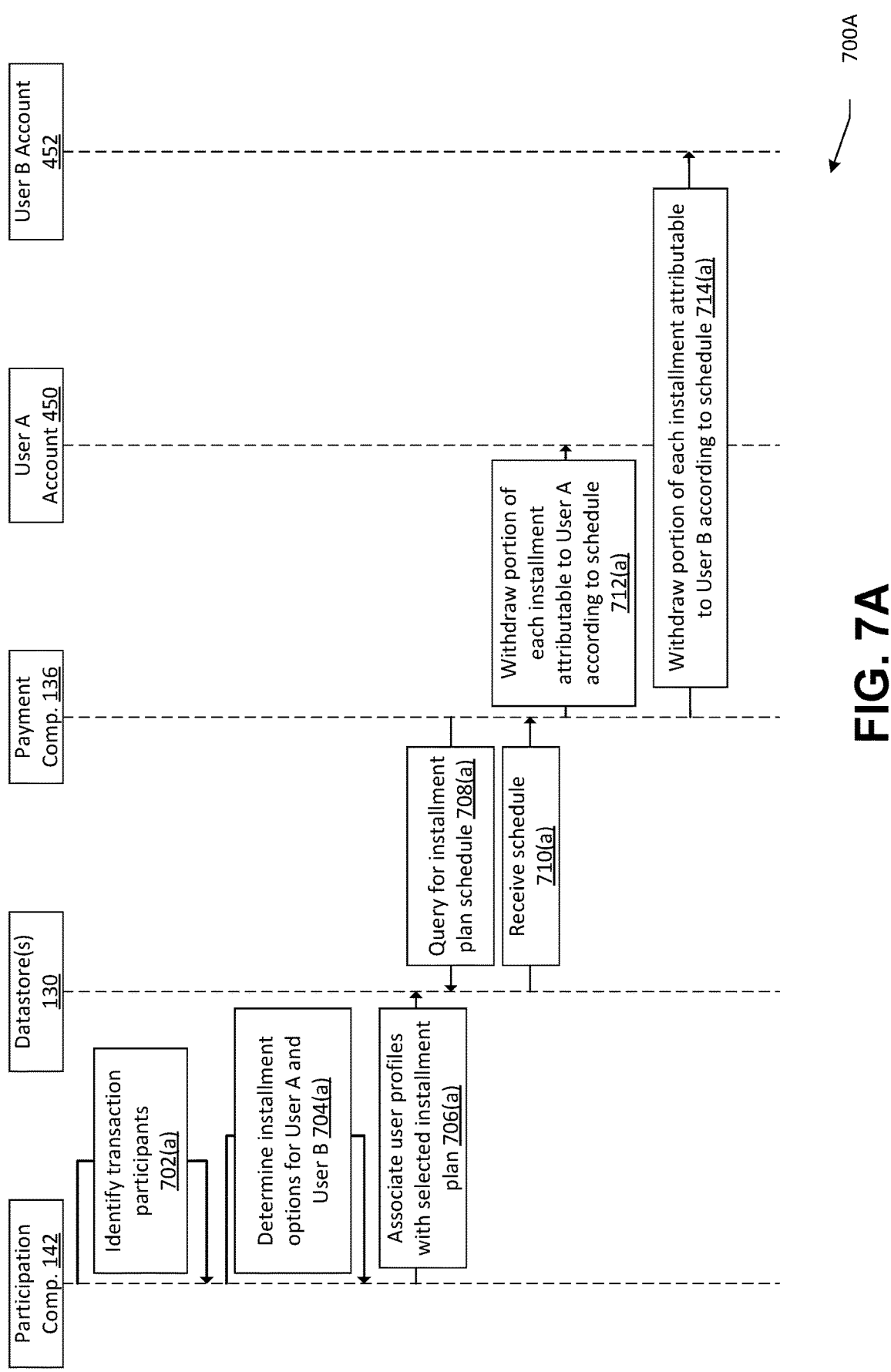
FIG. 7A is a sequence diagram showing an example process for apportioning payments across users in a multi-user transaction, according to an embodiment described herein.

FIG. 7A is a sequence diagram showing an example process for apportioning payments across users in a multi-user transaction, according to an embodiment described herein. The process 700A may utilize one or more components described with respect to FIG. 1. For example, the process 700A may include the use of a participation component 142, one or more datastores 130, and a payment component 136. The process 700A may also include the user of one or more accounts 134, including a User A account 450 and a User B account 452. The processes described with respect to FIG. 7A are presented sequentially from blocks 702(a) to 714(a). However, it should be understood that the processes need not be performed in the order represented in FIG. 7A and that at least some of the processes may be performed in parallel with other processes.

At step 702(a), the participation component 142 may identify transaction participants for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 704(a), the participation component 142 may determine payment installment options to provide to the users at issue based at least in part on participant data for the user involved, here being User A and User B. For example, one or more payment installment plan options may be surfaced to the users in the multi-user transaction. Typically, a payment installment plan provides a user with the option to pay for an item or items over time, making predefined partial payments over a certain number of installments (e.g., four monthly payments of $25 for a $100 item). In the multi-user transactions described herein, the payment installment plans may differ. For example, a first installment plan option may be presented to one of the users while a second, different installment plan option may be presented to another of the users in the same multi-user transaction. The payment service may determine which of multiple potential installment plans are to be presented as options to a given user based at least in part on participant data for the user(s), prior transaction data, transaction data associated with the current transaction, user preferences, etc. By so doing, the payment service may determine user-specific installment plan options on-the-fly prior to conclusion of the transaction at issue. This may provide potential users with needed information to determine whether to opt into the transaction in a way that could not be performed absent the time sensitive, on-the-fly determinations described herein. In examples, identification of installment plans as options for a given user may be based at least in part on machine learning techniques as described more fully herein.

At step 706(a), the participation component 142 may send data to the datastores 130 that associates the user profiles for the users with selected installment plans. In examples, the data may indicate that, for a given profile, that profile is associated with the selected installment plan. In other examples, the data may indicate a schedule for payments to be made based on the installment plan.

At step 708(a), the payment component 136 may query the one or more datastores 130 for the data associating the user profiles with the selected installment plans. For example, periodically or otherwise, the payment component 136 may be caused to query the datastores 130 for an indication of which profiles are to provide a payment based on an installment plan. In other examples, querying of the datastores 130 may be performed based at least in part on a scheduled query of the datastores 130 as determined from the installment plans at issue.

At step 710(a), the payment component 136 may receive the requested data from the datastores 130 or a schedule indicating when payments are to be made based on the installment plans that were selected. Having received the requested data, the payment component 136 may be configured to determine if the data indicates that a payment is to be made or not. When the data indicates that a payment is to be made, the payment component 136 may initiate a process for withdrawing the appropriate funds and for depositing such funds into a merchant account, a payment service account, or another account associated with installment plans.

At step 712(a), the payment component 136 may withdraw a portion of each installment in the selected installment plan attributable to User A from the User A account 450 according to the schedule. For example, if each installment in the installment plan is for a $30 payment and the transaction involved two users, the User A account 450 may have $15 (half of the total for the installment) withdrawn therefrom. In other examples, the percentage of the total installment payment may not be equal across users such that a given user may pay more than half of the installment cost.

At step 714(*a*), the payment component 136 may withdraw a portion of each installment in the selected installment plan attributable to User B from the User B account 452 according to the schedule. Withdrawal of the portion of the installment for User B may be performed in the same or a similar manner as described above with respect to step 712(*a*).

Figure 7B:
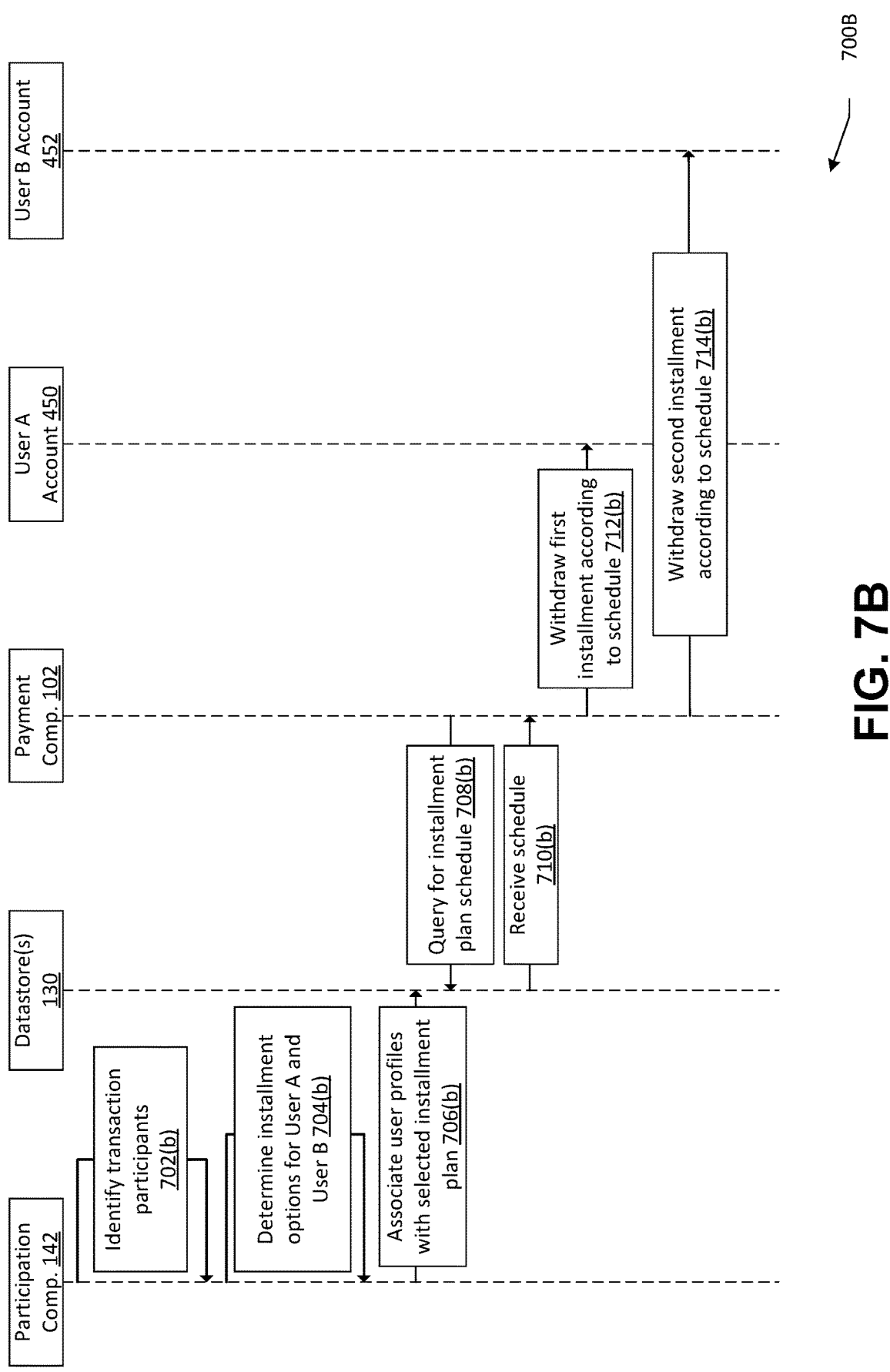
FIG. 7B is a sequence diagram showing another example process for apportioning payments across users in a multi-user transaction, according to an embodiment described herein.

FIG. 7B is a sequence diagram showing another example process for apportioning payments across users in a multi-user transaction, according to an embodiment described herein. The process 700B may utilize one or more components described with respect to FIG. 1. For example, the process 700B may include the use of a participation component 142, one or more datastores 130, and a payment component 136. The process 700B may also include the user of one or more accounts 134, including a User A account 450 and a User B account 452. The processes described with respect to FIG. 7B are presented sequentially from blocks 702(*b*) to 714(*b*). However, it should be understood that the processes need not be performed in the order represented in FIG. 7B and that at least some of the processes may be performed in parallel with other processes.

At step 702(*b*), the participation component 142 may identify transaction participants for a multi-user transaction. As described more fully with respect to FIG. 5, the participation component 142 may determine that a given transaction is a candidate for a multi-user transaction, may send interactive elements to potential secondary users, may receive user input data opting into the multi-user transaction, and may determine which user profiles are associated with the users for the transaction.

At step 704(*b*), the participation component 142 may determine payment installment options to provide to the users at issue based at least in part on participant data for the user involved, here being User A and User B. For example, one or more payment installment plan options may be surfaced to the users in the multi-user transaction. Typically, a payment installment plan provides a user with the option to pay for an item or items over time, making predefined partial payments over a certain number of installments (e.g., four monthly payments of $25 for a $100 item). In the multi-user transactions described herein, the payment installment plans may differ. For example, a first installment plan option may be presented to one of the users while a second, different installment plan option may be presented to another of the users in the same multi-user transaction. The payment service may determine which of multiple potential installment plans are to be presented as options to a given user based at least in part on participant data for the user(s), prior transaction data, transaction data associated with the current transaction, user preferences, etc. By so doing, the payment service may determine user-specific installment plan options on-the-fly prior to conclusion of the transaction at issue. This may provide potential users with needed information to determine whether to opt into the transaction in a way that could not be performed absent the time sensitive, on-the-fly determinations described herein. In examples, identification of installment plans as options for a given user may be based at least in part on machine learning techniques as described more fully herein.

At step 706(*b*), the participation component 142 may send data to the datastores 130 that associates the user profiles for the users with selected installment plans. In examples, the data may indicate that, for a given profile, that profile is associated with the selected installment plan. In other examples, the data may indicate a schedule for payments to be made based on the installment plan.

At step 708(*b*), the payment component 136 may query the one or more datastores 130 for the data associating the user profiles with the selected installment plans. For example, periodically or otherwise, the payment component 136 may be caused to query the datastores 136 for an indication of which profiles are to provide a payment based on an installment plan. In other examples, querying of the datastores 130 may be performed based at least in part on a scheduled query of the datastores 130 as determined from the installment plans at issue.

At step 710(*b*), the payment component 136 may receive the requested data from the datastores 130 or a schedule indicating when payments are to be made based on the installment plans that were selected. Having received the requested data, the payment component 136 may be configured to determine if the data indicates that a payment is to be made or not. When the data indicates that a payment is to be made, the payment component 136 may initiate a process for withdrawing the appropriate funds and for depositing such funds into a merchant account, a payment service account, or another account associated with installment plans.

At step 712(*b*), the payment component 136 may withdraw funds for the first installment from one of the users according to the schedule, such as User A as shown in FIG. 7A. For example, if each installment in the installment plan is for a $30 payment, the User A account 450 may have $30 withdrawn therefrom when the first installment is due.

At step 714(*a*), the payment component 136 may withdraw funds for the second installment from one of the users according to the schedule, such as User B as shown in FIG. 7B. For example if each installment in the installment plan is for a $30 payment, the User B account 452 may have $30 withdrawn therefrom when the second installment is due. It should be understood that the number of installments, amounts, and other example details are nonlimiting. By utilizing the process above, one user in a given transaction may pay a portion of the installments while one or more other users in the same transaction may pay the other portions of the installments.

Figure 8:
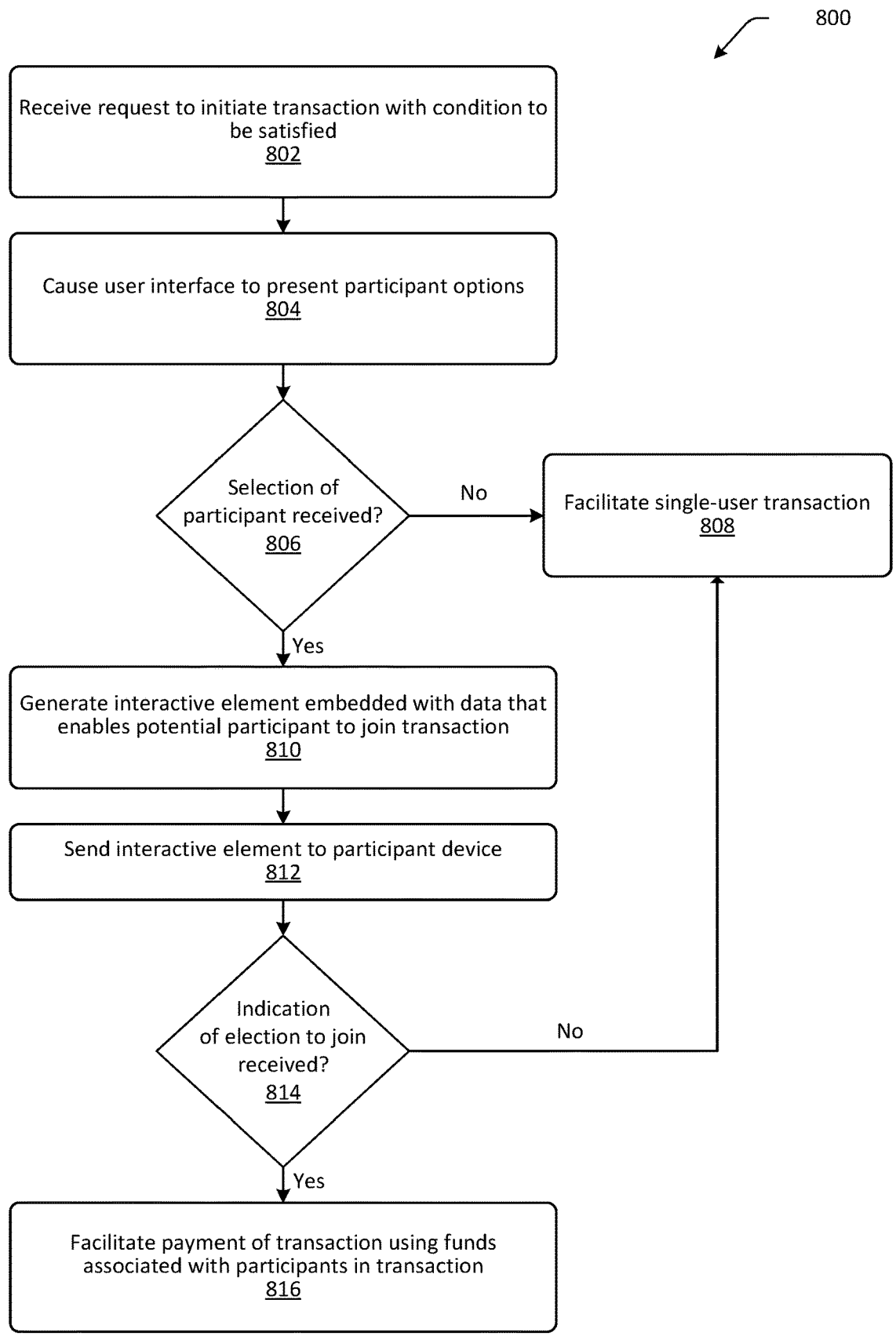
FIG. 8 is a flow diagram of an example process for integration of multi-user interactions using data linkage.

FIG. 8 is a flow diagram of an example process 900 for integration of multi-user interactions using data linkage, according to an embodiment described herein. The order in which the operations or steps are described is not intended to be construed as a limitation, and any number of the described operations may be combined in any order and/or in parallel to implement process 800.

At block 802, the process 800 may include receiving a request to initiate a transaction with a condition to be satisfied, such as a time window for a purchase of an item. For example, a primary user may provide user input data indicating an intent to initiate a transaction. This input data may be received at a user interface associated with an ecommerce website associated with a merchant, a POS terminal physically located at a merchant location, in association with a payment application associated with the payment service, etc. In certain examples, the transaction may not be a candidate for multiple users participating therein, such as when the primary user is buying a shirt, is scheduling an oil change, etc. However, in other transactions, a condition is to be satisfied for the transaction to be completed successfully. In examples, the condition may be a time window for purchasing the item(s). In these and other examples, the payment service may be configured to identify, for a given transaction, that the transaction includes the condition to be satisfied and that the transaction is for the purchase of multiple items or for an item that has multiple portions. In other examples, given merchants or merchant categories may be identified that are associated with items that may be purchased as a multi-user transaction. Identification of the merchants, merchant categories, or conditions to be satisfied may be performed utilizing machine learning techniques, as described more fully below with respect to FIG. 9. As described more fully above, utilizing the processes described with respect to FIG. 8 allows for the use of modeling, including machine learning models, to determine whether a given transaction is a candidate for a multi-user transaction. The use of modeling in this regard grounds the techniques described herein in a computer-centric environment and produces results that offer improvements over conventional technologies. These improvements include, for example, time sensitive identification of candidate multi-user transactions. The models may be trained again and again over time, each time learning new parameters or updating parameter weighting to make the results of those models more accurate, more timely, etc.

At block 804, the process 800 may include causing a user interface to present participant options. For example, once a transaction is identified as a potential multi-user transaction, the user interface presented to the primary user may be updated, customized, or otherwise to include a selectable element that represents an option to find participants for the multi-user transaction. When selected, the user interface may be caused to present functionality for the primary user, who is associated with a first user profile, to select one or more other user profiles associated with potential users to invite to participate in the transaction. User contacts data from the payment service, the payment application, the primary user's device, or any other source may be utilized to present potential user profiles to the primary user. In an example, selection of participants may be customized based on user preferences and characteristics of the item(s) in the transaction. In the concert ticket example above, the primary user may be able to identify which seat (or item or portion of item) is to be associated with which potential other user, prices for each potential other user, priority of potential other users, etc. In other examples, the payment service may determine what aspects of the transaction are to be associated with the various potential other users. In still other examples, these aspects may not be specified by the primary user or the payment service, but may ultimately be determined by the other users that opt into transaction participation. For example, the seats may be first come first served. In some examples, initiation of the transaction can trigger the generation of a channel (e.g., an "open ticket," a "shared virtual cart," etc.) in which the first user can request additional user(s) to participate in the transaction. That is, in some examples, initiation of the transaction can trigger the generation of a shared channel, which in some examples can be temporarily available (e.g., based on a time window for purchase, a geolocation, an event type, appointment parameters, an item type, or other condition), within which a multi-user transaction can be facilitated. It should be understood that machine learning techniques such as those described herein may be utilized to recommend participants in a given multi-user transaction. The machine learning models may utilize, as input, data indicating user proximity, prior interactions, prior transactions, data indicating interests of the users, data indicating similarities of the users, etc. to generate, as output, a recommendation for a participant to request to join a transaction.

At block 806, the process 800 may include determining whether selection of a participant for the transaction has been received. For example, the primary user may be presented with options or suggestions for participants to join the transaction. If the primary user provides user input data indicating selection of an option or suggestion, then an indication of that selection may be received.

In examples where an indication of the selection is not received, the process 800 may include, at block 808, facilitating a single-user transaction. In this example, the primary user has indicated that another user is not to be added to the transaction and the primary user has selected to proceed with the transaction.

In examples where an indication of the selection is received, the process 800 may include, at block 810, generating an interactive element embedded with data that enables the potential participant to join the transaction. For example, an interactive element component of the payment service may generate one or more interactive elements embedded with data that may be sent to devices of the potential other users. Each interactive element may be user specific, transaction specific, item specific, etc. For example, a given secondary user may receive an interactive element identifying a specific item to be assigned to the secondary user if the secondary user opts into the transaction. The interactive element may also indicate the condition to be satisfied for the transaction to proceed, such as an amount of time left to complete the transaction or for the potential other user to opt in. As such, generation of the interactive element may be dynamic and may change prior to completion of the transaction. In examples, the interactive element, when selected, may cause a payment application or other user interface to be enabled and to display functionality for receiving user input data indicating an intent to participate in the transaction, as well as, in examples, selection of details about the transaction to be assigned to the potential other user. Additional details on the interactive elements are provided with respect to FIG. 1. As described more fully above, the presentation of options associated with a multi-user transaction may include the use of interactive elements embedded with data. The time-sensitive nature of many multi-user transactions does not allow for a manual user-centric solution. Instead, as described herein, various analytic operations associated with generation of interactive elements occur within the time sensitive windows discussed herein and in a way that integrates functionality of disparate digital platforms to facilitate secure multi-user transactions. To solve these and other computer-centric problems, the techniques and systems described herein utilize computer-centric solutions associated with secure and user-specific interactive elements that easily trace back to the same multi-user transaction.

At block 812, the process 800 may include sending the interactive element to a participant device. For example, the interactive element may be sent to a secondary user device, which may receive data representing the interactive element to cause display of functionality associated with the interactive element. In examples, receipt of data representing the interactive element may cause an application, such as the payment application described herein, to enable and to automatically display the interactive element. Given the time sensitive nature of at least some multi-user transactions, the automatic enablement and display of the interactive element may allow a user of the device on which the interactive element is displayed to quickly interact with the interactive element and elect to participate in the multi-user transaction.

At block 814, the process 800 may include determining whether an indication of election to join the transaction has been received from one or more secondary users. For example, the secondary users may interact with the interactive element to indicate an intent to join the transaction. An indication of such interactions may be received and utilized to determine that the transaction should be a multi-user transaction.

In examples where an indication of election to join the transaction is not received, the process 800 may continue to block 808, where the system may facilitate a single-user transaction. In this example, while the primary user provide input to initiate a multi-user transaction, none of the invited participants provided input to join the transaction. As such, the primary user may be presented with an option to proceed with the transaction as a single-user transaction.

In examples where an indication of election to join the transaction is received, the process 800 may include, at block 816, facilitating payment of the transaction using funds associated with the participants in the transaction. For example, payment of transaction may be made in association with the primary user account, one or more of the secondary user accounts, or the payment service account. Funds for the transaction may be deposited from one or more of these accounts to the merchant account for the merchant at issue in the transaction. As noted in more detail above, multi-user transactions such as those described herein require data transmission across disparate devices and systems all within a limited period of time. This would typically lead to networking issues in the network of devices where communication protocols across the various device and system type differ. However, utilizing the techniques described herein, a network of user devices and systems may be generated when a transaction is identified as being a multi-user transaction. To do so, user profiles are parsed to determine which users are participants in the multi-user transaction, which devices are associated with those users, and parameters for sending and receiving information for the transfer of funds are determined. The identified devices for a transaction are then associated to form a network that provides communication between the devices and a system, such as the payment service. The network may be "secure" in that it transmits communications and/or data via the payment service and/or other secured integrations. The established network of devices and system can be utilized to securely send data related to the multi-user transaction to the various devices and systems. This marks an improvement over existing techniques by creating a secure network of devices and systems that include the multiple users in the multi-user transaction, whereas existing techniques require the use of multiple networks for each user to a transaction.

Additionally, or alternatively, the process 800 may include determining that the item is physically proximate to the additional item, the additional item is an instance of the item, the additional item is designated as similar to the item, or the item and the additional item are associated with a specific event. The process 800 may also include utilizing the results of determining the relationship between the item and the additional item to determine that a multi-user transaction is an option for the transaction.

Additionally, or alternatively, the process 800 may include withdrawing the funds to purchase the item and the additional item from the account of the first user profile. The process 800 may also include causing the funds to be deposited into an account of a merchant that provides the item and the additional item. The process 800 may also include withdrawing a portion of the funds associated with the additional item from the account of the second user profile. The process 800 may also include causing the portion of the funds to be deposited into the account of the first user profile.

Additionally, or alternatively, the process 800 may include withdrawing the funds to purchase the item and the additional item from the account of the service provider. The process 800 may also include causing the funds to be deposited into an account of a merchant that provides the item and the additional item. The process 800 may also include withdrawing a first portion of the funds associated with the item from the account of the first user profile. The process 800 may also include withdrawing a second portion of the funds associated with the additional item from the account of the second user profile. The process 800 may also include causing the first portion of the funds and the second portion of the funds to be deposited into the account of the service provider.

Additionally, or alternatively, the process 800 may include receiving a request to use an installment plan offered by the service provider for the payment of the transaction. The process 800 may also include generating at least one installment plan for the first user profile and the second user profile, wherein at least one installment is paid using funds from the account associated with the first user profile and at least one installment is paid using funds from the account associated with the second user profile.

Additionally, or alternatively, the process 800 may include receiving a request to use an installment plan offered by the service provider for the payment of the transaction. The process 800 may also include generating at least one installment plan for the first user profile and the second user profile, wherein a first portion of at least one installment is paid using funds from the account associated with the first user profile and a second portion of the at least one installment is paid using funds from the account of the second user profile.

Additionally, or alternatively, the process 800 may include receiving a request to use an installment plan offered by the service provider for the payment of the transaction. The process 800 may also include selecting the installment plan from multiple potential installment plan options based at least in part on first user data associated with the first user profile and second user data associated with the second user profile. The process 800 may also include causing display of an indicator of the installment plan as an option for satisfying the payment of the transaction.

Additionally, or alternatively, the process 800 may include receiving a request to use an installment plan offered by the service provider for the payment of the transaction. The process 800 may also include selecting a first installment plan of multiple potential installment plans to provide as a first payment option to the first user profile based at least in part on first user data associated with the first user profile. The process 800 may also include selecting a second installment plan of the multiple potential installment plans to provide as a second payment option to the second user profile based at least in part on second user data associated with the second user profile, wherein the first installment plan differs from the second installment plan.

Additionally, or alternatively, the process 800 may include receiving a selection of a third user profile. The process 800 may also include generating a second interactive element embedded with the data, the second interactive element including information specific to the third user profile and another item to be purchased in association with the item, wherein the first interactive element includes information specific to the second user profile and the additional item.

Additionally, or alternatively, the process 800 may include causing, based at least in part on receiving the request, the user interface to display an indication that the transaction is pending opt in from the at least the secondary user profile. The process 800 may also include causing, based at least in part on receiving the indication of the intent to participate in the transaction, the user interface to be updated to display an indication that the transaction is no longer pending opt in and is enabled to receive payment information for satisfying a cost of the transaction.

Additionally, or alternatively, the process 800 may include determining, based at least in part on characteristics of the item, that a first portion of the item to be associated with the first user profile is similar to a second portion of the item to be associated with the second user profile. In these examples, the interactive element may indicate that the second user profile is to be associated with the second portion of the item when the user requests to participate in the transaction.

Additionally, or alternatively, the process 800 may include determining, based at least in part on characteristics of the item, that the item is be associated with the first user profile and the additional item is to be associated with the second user profile, wherein the item and the additional item are associated with a specific event. In these examples, the interactive element may indicate that the second user profile is to be associated with the additional item when the user requests to participate in the transaction.

Figure 9:
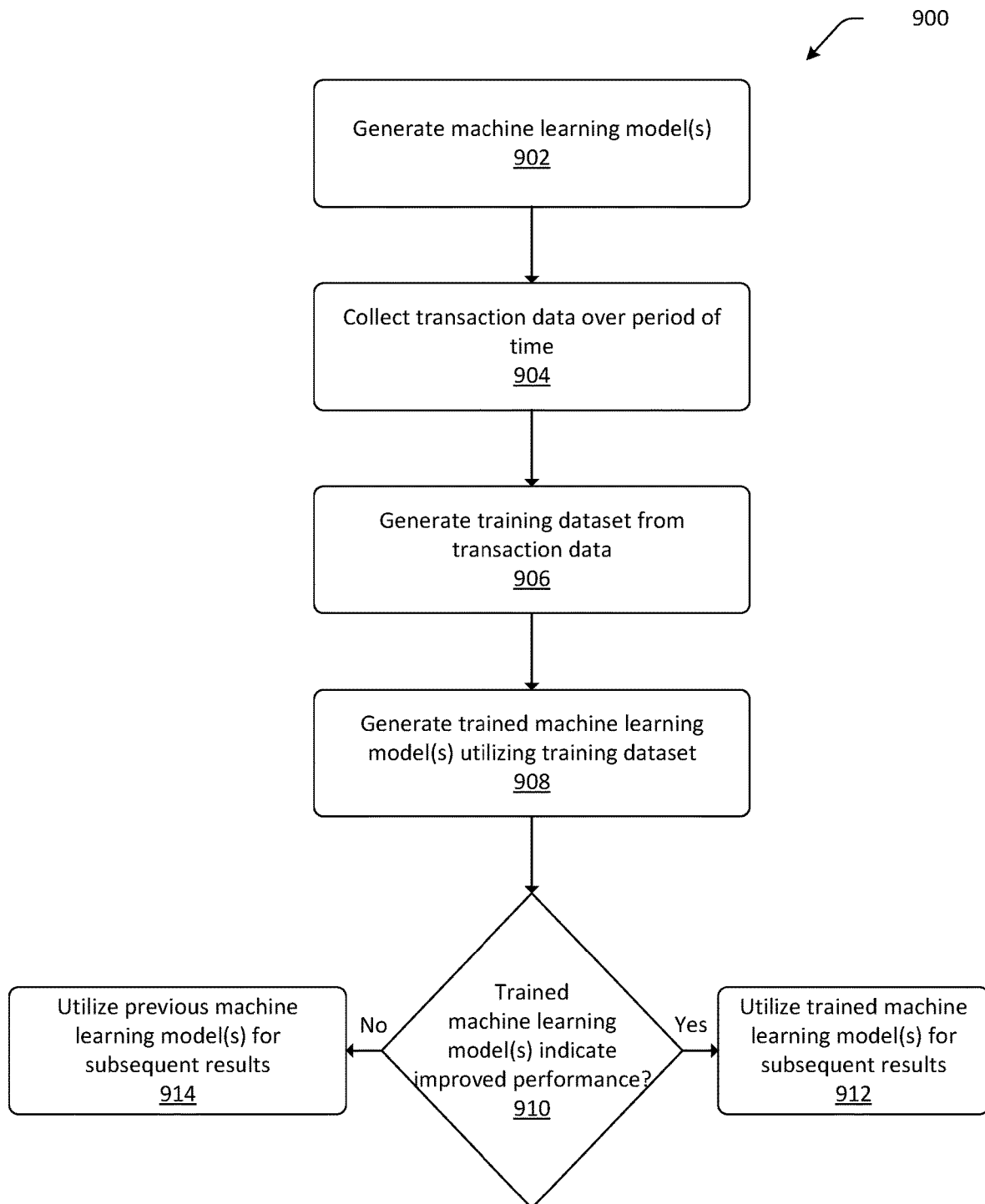
FIG. 9 is a flow diagram of an example process for the generation and training of machine learning models to perform one or more of the processes described herein, according to an embodiment described herein.

FIG. 9 is a flow diagram of an example process 900 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 900.

At block 902, the process 900 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 904, the process 900 may include collecting transaction data over a period of time. The transaction data may include any of the data described with respect to the datastore(s) 130, any data associated with multi-user transactions, any data described with respect to FIGS. 1-7B, or any other data that may be utilized to perform the operations described herein. This information may include factors associated with items made available for multi-user transactions, such as timing data, user feedback, interactions with the payment application, interactions with interactive elements, etc.

At block 906, the process 900 may include generating a training dataset from the transaction data. Generation of the training dataset may include formatting the transaction data into input vectors for the machine learning model to intake, as well as associating the various data with the outcomes of multi-user transactions described herein. With respect to the training dataset, the dataset may include any of the data described herein. By way of example, and not as a limitation, the training dataset may include item types, merchant types and categories, feedback data indicating previous transactions identified as multi-user transactions, previously selected installment plan options, previously-identified candidate users for a multi-user transaction, and the like. Additionally, the training dataset may include user profile data indicating past transactions for a given user and past use of installment plans. Additionally, the training dataset may include feedback data indicating previously generated interactive elements and user input data received in response to such interactive elements. Additionally, the training dataset may include data indicating how a transaction with multiple items was previously split or how a single item was split between users.

At block 908, the process 900 may include generating one or more trained machine learning models utilizing the training dataset. Generation of the trained machine learning models may include updating parameters and/or weightings and/or thresholds utilized by the models to generate recommendations, user preferences, interactive elements, installment plan options, etc. based at least in part on the data from the training dataset. The trained machine learning models may be configured to perform some or all of the operations described herein. In examples, the trained machine learning models may be configured to identify a transaction as a candidate multi-user transaction, to identify secondary customers for the transaction, to allocate items or item portions, to identify payment options including installment plan options, to determine how payment for a multi-user transaction should proceed (including whether a primary customer or a payment service should initially pay of a cost of a transaction and seek reimbursement from secondary customers thereafter), determining whether the same or different installment plan options should be presented to users in a multi-user transaction, which users should pay which portions of installment plans, etc.

At block 910, the process 900 may include determining whether the trained machine learning models indicate improved performance metrics. For example, a testing group may be generated where the outcomes of the multi-user transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 900 may include, at block 912, utilizing the trained machine learning models for generating subsequent results. For example, the trained machine learning models may be utilized to generate interactive elements, to identify characteristics of items, to determine if a transaction may be a multi-user transaction, etc. Additionally, the trained machine learning models may be utilized to adjust or recommend adjusting user preferences or condition thresholds as described herein. It should be understood that the trained machine learning models may be utilized in any scenario where models are utilized as described herein.

In examples where the trained machine learning models do not indicate improved performance metrics, the process 900 may include, at block 914, utilizing the previous iteration of the machine learning models for generating subsequent results.

Figure 10:
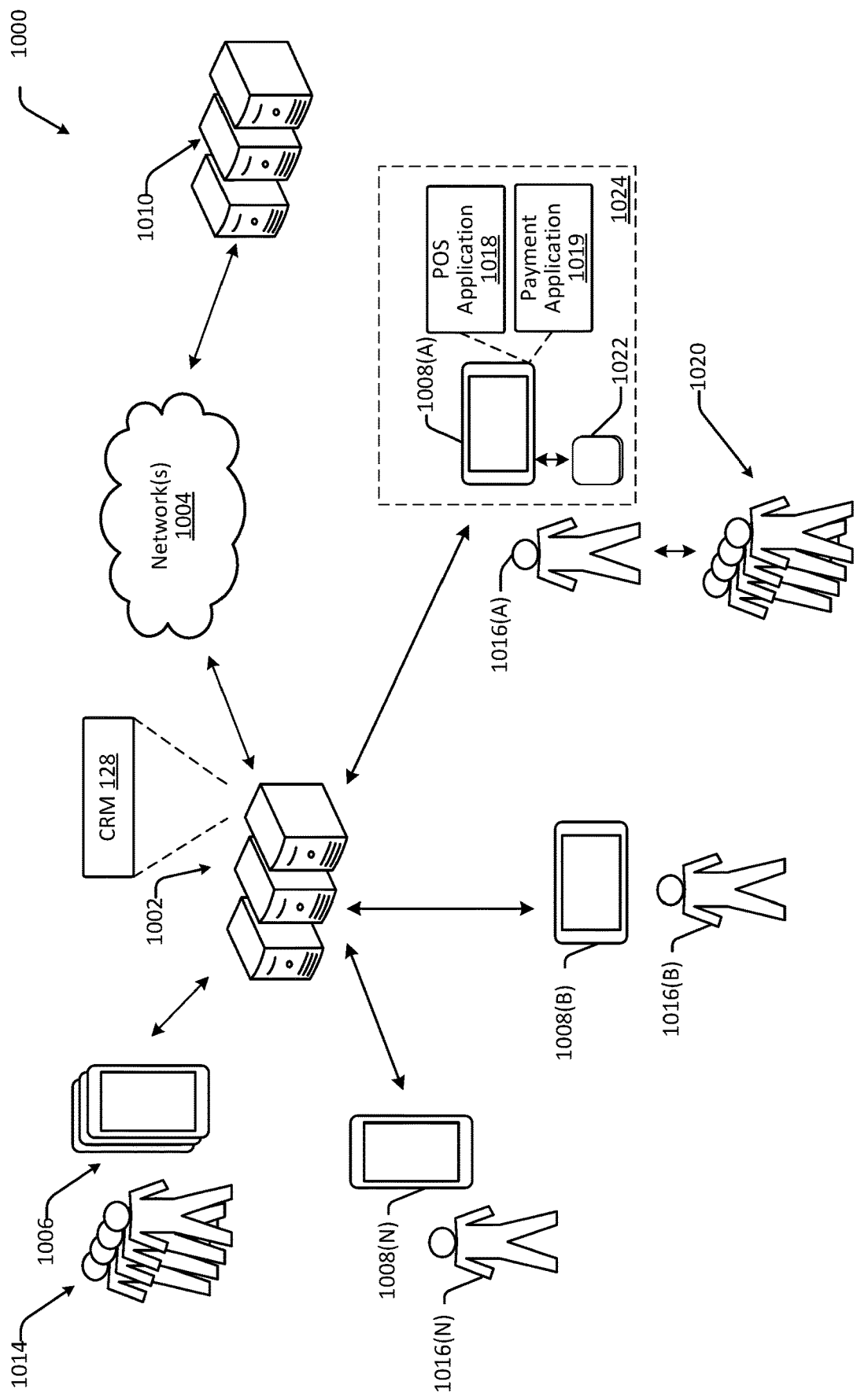
FIG. 10 is an example environment with user devices, merchant devices, a payment service, and/or other systems that may be involved in a transaction, such as by utilizing the payment application as configured herein, according to an embodiment described herein.

FIG. 10 is an example environment with user devices, merchant devices, a payment service, and/or other systems that may be involved in a transaction, such as by utilizing the payment application as configured herein, according to an embodiment described herein. The environment 1000 includes server(s) 1002 that can communicate over a network 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the server(s) 1002 may be the same as or similar to the payment service 104 from FIG. 1, which may include the same or similar components as described with respect to the payment service 104 of FIG. 1, including the components of the CRM 128 as shown in FIG. 10. Further, the user devices 102 from FIG. 1 may have the same or similar components and perform the same or similar functionality as the user devices 1006 from FIG. 10.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more users 1020. As described above, the users 1014 can include users, such as the users 1020 shown as interacting with the merchant 1016(A). For the purpose of this discussion, a "user" can be any entity that acquires items from merchants. While only two users 1020 are illustrated in FIG. 10, any number of users 1020 can interact with the merchants 1016. Further, while FIG. 10 illustrates the users 1020 interacting with the merchant 1016(A), the users 1020 can interact with any of the merchants 1016.

In at least one example, interactions between the users 1020 and the merchants 1016 that involve the exchange of funds (from the users 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the users 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and users 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the users 1020. In additional or alternative examples, the POS terminal can have a display integrated therein for presenting information to the users 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a user 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a user 1020 slides a card, or other payment instrument, having a magnetic strip through a reader device 1022 that captures payment data contained in the magnetic strip. A dip is a card-present transaction where a user 1020 inserts a payment instrument having an embedded microchip (i.e., chip) into a reader device 1022 first. The dipped payment instrument remains in the payment reader until the reader device 1022 prompts the user 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a user 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, user, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the user has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the user 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the user 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the users 1020 when conducting POS transactions with the users 1020. For instance, the service provider can enable the merchants 1016 to receive cash payments, payment card payments, and/or electronic payments from users 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfilment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1012 associates capital to a merchant or user's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a user places an order with a merchant and the merchant cannot fulfill the order because one or more items are out of stock or otherwise unavailable, the service provider can leverage other merchants and/or sales channels that are part of the platform of the service provider to fulfill the user's order. That is, another merchant can provide the one or more items to fulfill the order of the user. Furthermore, in some examples, another sales channel (e.g., online, brick-and-mortar, etc.) can be used to fulfill the order of the user.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate user service, offer promotions, provide recommendations, or otherwise interact with users in real-time. In at least one example, the service provider can integrate products and services, and payment mechanisms into a communication platform (e.g., messaging, etc.) to enable users to make purchases, or otherwise transact, without having to call, email, or visit a web page or other channel of a merchant. That is, conversational commerce alleviates the need for users to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a user (or potential user) to provide information that is used by compliance departments to prove that the information is associated with an identity of a real person or entity. In at least one example, the service provider can perform services for determining whether identifying information provided by a user 1014 accurately identifies the user (or potential user) (i.e., Is the user who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation— or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
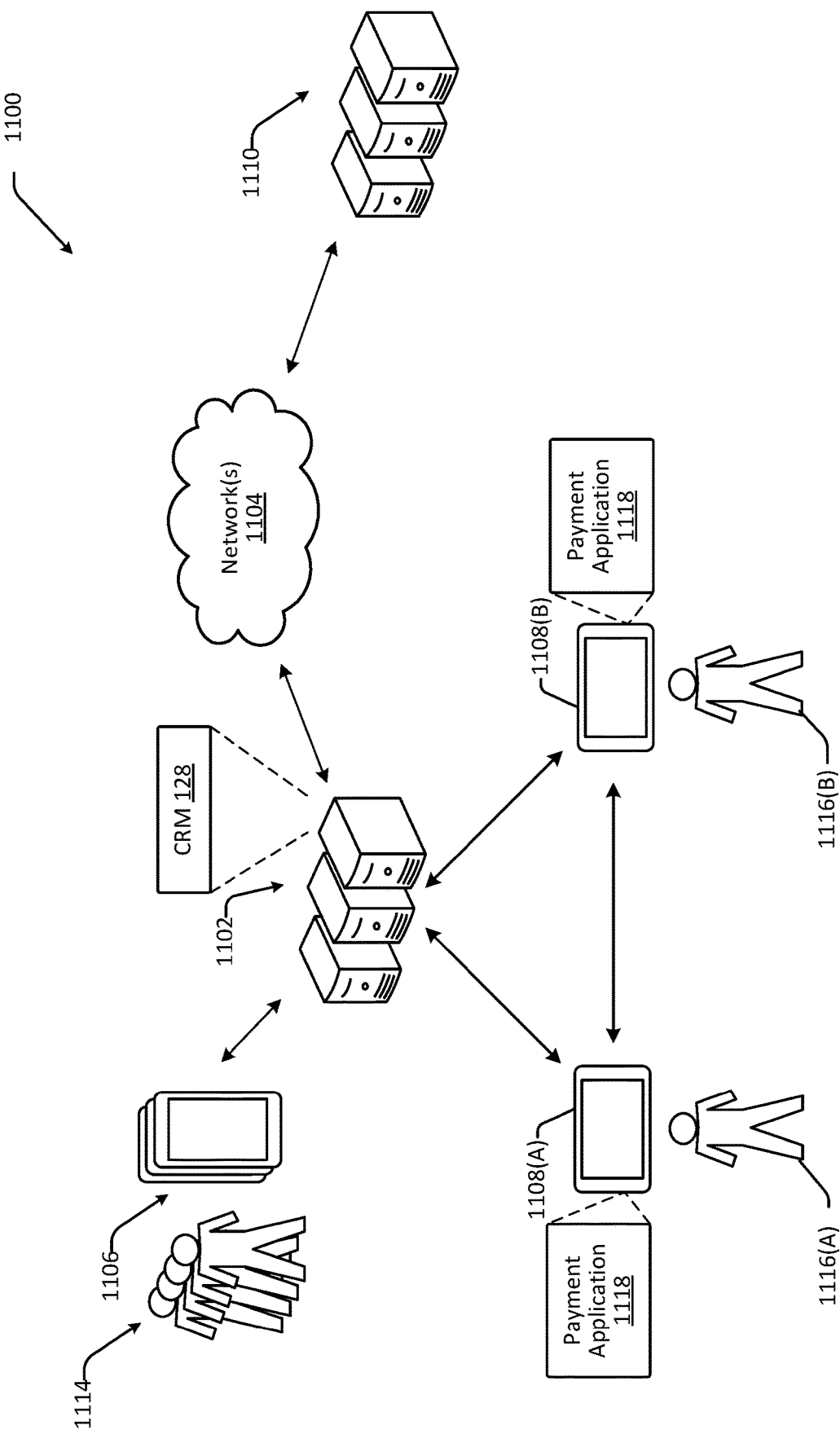
FIG. 11 is an example environment illustrating usage of the payment application, such as described herein, according to an embodiment described herein.

FIG. 11 is an example environment illustrating usage of the payment application, according to an embodiment described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

As described herein, the server(s) 1102 may be the same or similar to the payment service 104 described with respect to FIG. 1, which may include the same or similar components as described with respect to the payment service 104 of FIG. 1, including the components of the CRM 128 as shown in FIG. 11. The user devices 1106, 1108 may be the same or similar to the user devices 102, 103 described with respect to FIG. 1. The server(s) 1110 associated with third-party service provider(s) may be the same as or similar to the systems associated with payment services or the like, as described herein.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
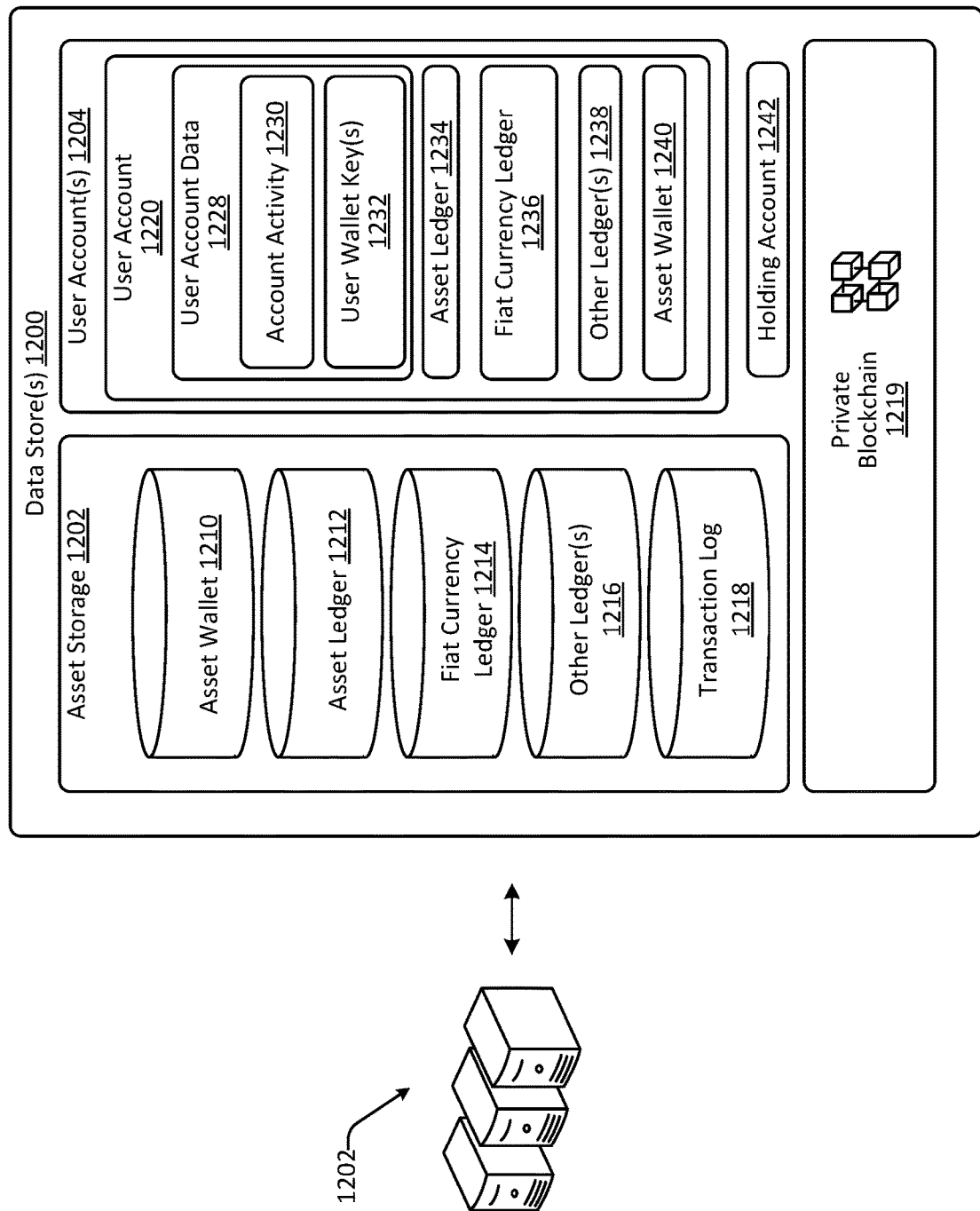
FIG. 12 is an example of datastore(s) that can be associated with servers of the payment service, according to an embodiment described herein.

In some examples, the service provider can utilize a ledger system to track transfers of assets between users 1106. FIG. 12, below, provides additional details associated with such a ledger system. The ledger system can enable users 1106 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1106 to transfer fiat currency, non-fiat currency, cryptocurrency, securities, or other assets, or portions thereof, to other users 1106. In at least one example, individual users can be associated with user accounts. Additional details associated with user accounts and the transfer of assets between users 1106 are described below with reference to FIG. 12.

Furthermore, the service provider of FIG. 11 can enable users 1106 to perform banking transactions via instances of the payment application 1118. For example, users can configure direct deposits or other deposits for adding assets to their various ledgers/balances. Further, users 1106 can configure bill pay, recurring payments, and/or the like using assets associated with their accounts. In addition to sending and/or receiving assets via peer-to-peer transactions, users 1106 buy and/or sell assets via asset networks such as cryptocurrency networks, securities networks, and/or the like.

FIG. 12 is an example of data store(s) that can be associated with servers of the payment service, according to an embodiment described herein. In at least one example, the data store(s) 1200 can store assets in an asset storage 1202, as well as data in user account(s) 1204, merchant account(s) 1206, and/or user account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1106. Specifically, the asset storage 1202 may include asset ledger 1234, fiat currency ledger 1214, and other ledger(s) 1216, which can be used to record transfers of assets between users 1106 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or user account(s) 1208. In at least one example, the user account(s) 1204 may store records of user accounts associated with the users 1106. In at least one example, the user account(s) 1204 can include a user account 1220, which can be associated with a user (of the users 1106). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1214, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s) 118). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of a transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1234, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a user is paying in cryptocurrency and the user has their own cryptocurrency wallet account associated with the service provider of FIG. 11, the user can send a message signed by its private key including its wallet address (i.e., of the user) and identifying the cryptocurrency and value to be transferred to the merchant's asset wallet 1240. The service provider of FIG. 11 can complete the transaction by reducing the cryptocurrency balance in the user's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1200 may also include a holding account 1242, which may be similar to and perform similar functions as the holding account 146 described with respect to FIG. 1.

It should be noted that user(s) having accounts managed by the service provider of FIG. 11 is an aspect of the technology disclosed that enables technical advantages of increased processing speed and improved security.

Figure 13:
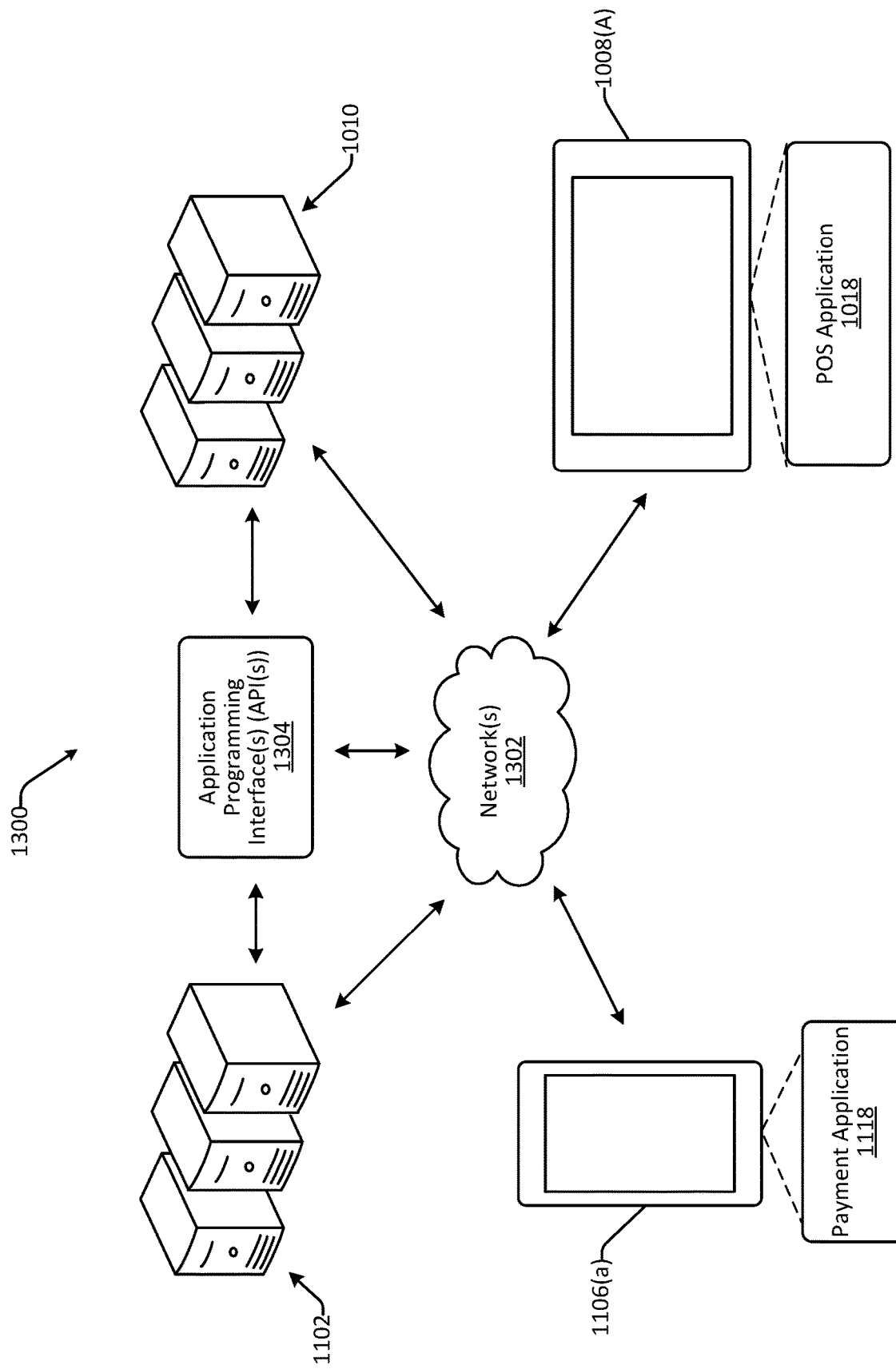
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 is an example environment 1300 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1302. In some examples, one or more APIs 1304 or other functional components can be used to facilitate such communication.

For example, the APIs 1304 can be used to facilitate communication with payment service server(s) 1102 and server(s) 1110 associated with third-party service provider(s).

In at least one example, the example environment 1300 can enable contactless payments, via integration of peer-to-peer payment, or other payment making, platform and payment processing platform(s), are described herein. For the purpose of FIG. 13, the environment 1000 can refer to a payment processing platform and the environment 1100 can refer to a peer-to-peer payment, or payment making, platform. In an example, such an integration can enable a user to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the user and the merchant. The QR code, or other transaction code, can be provided to the POS application 1018 via an API associated with the peer-to-peer payment platform. In an example, the user can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the user is a first "peer" and the merchant is a second "peer." In at least one example, the peer-to-peer payment platform can transfer funds from an account of the user, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, user details, or the like to a computing device of the user, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable users to "scan to pay," by using their computing devices to scan QR codes, or other transaction codes, embedded with data as described herein, to remit payments for transactions. In such a "scan to pay" example, a user computing device, such as the user device 1108(A), can be specially configured as a buyer-facing device that can enable the user to view cart building in near real-time, interact with a transaction during cart building using the user computing device, authorize payment via the user computing device, apply coupons or other incentives via the user computing device, add gratuity, loyalty information, feedback, or the like via the user computing device, etc. In another example, merchants can "scan for payment" such that a user can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable users to "scan to pay," by using their computing devices to scan or otherwise capture QR codes, or other transaction codes, embedded with data, as described herein, to remit payments for online/ecommerce transactions. In such a "scan to pay" example, a user computing device, such as the user device 1108(A), can be specially configured as a buyer-facing device that can enable the user to view cart building in near real-time, interact with a transaction during cart building using the user computing device, authorize payment via the user computing device, apply coupons or other incentives via the user computing device, add gratuity, loyalty information, feedback, or the like via the user computing device, etc.

In an example, a user can desire to purchase items from a merchant. When the user approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The user can use a camera associated with the user device 1108(A) to scan, or otherwise capture, the QR code. If the user is already associated with the peer-to-peer payment platform (e.g., has an existing account, previously onboarded, etc.), the peer-to-peer platform can provide an indication of the scanned QR code to the payment processing platform. This interaction—between the user computing device and the QR code—can trigger communications between the peer-to-peer payment platform and the payment processing platform (e.g., via an API) to facilitate a transfer of funds from a stored balance of the user, that is managed and/or maintained by the peer-to-peer payment platform, to a stored balance of the merchant, that is managed and/or maintained by the payment processing platform. As such, the user can use such funds for contactless payment of the transaction. Such a payment can be structured as a peer-to-peer payment wherein the user is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a user can desire to purchase items from a merchant. When the user approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The user can interact with the resource locator and, if the user is already associated with the peer-to-peer payment platform (e.g., has an existing account, previously onboarded, etc.), the peer-to-peer payment platform can provide an indication of the interaction with the resource locator to the payment processing platform. This interaction—between the user and the resource locator presented via the user computing device—can trigger communications between the peer-to-peer payment platform and the payment processing platform (e.g., via an API) to facilitate a transfer of funds from a stored balance of the user, that is managed and/or maintained by the peer-to-peer payment platform, to a stored balance of the merchant, that is managed and/or maintained by the payment processing platform. As such, the user can use such funds for contactless payment of the transaction. As described above, such a payment can be structured as a peer-to-peer payment wherein the user is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The user can use a camera associated with a user computing device, such as the user device 1108(A), to scan, or otherwise capture, the QR code. If the user is already associated with the peer-to-peer payment platform (e.g., has an existing account, previously onboarded, etc.), the peer-to-peer platform can provide an indication of the scanned QR code to the payment processing platform. This interaction—between the user computing device and the QR code—can trigger communications between the peer-to-peer payment platform and the payment processing platform (e.g., via an API) to facilitate a transfer of funds from a stored balance of the user, that is managed and/or maintained by the peer-to-peer payment platform, to a stored balance of the merchant, that is managed and/or maintained by the payment processing platform. As such, the user can use such funds for contactless payment of the transaction. Such a payment can be structured as a peer-to-peer payment wherein the user is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a user to enable the user to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the user can watch items being added to their cart (e.g., via a user interface presented via the payment application). As an item is added to a virtual cart by the merchant—via the POS application 1018 on the merchant device 1008(A) of the merchant—the user can see the item in their virtual cart on their own computing device in near-real time. In another example, the peer-to-peer payment platform can analyze transaction data as it is received to determine whether an incentive (e.g., a discount, a loyalty reward, prioritized access or hooking, etc.) is applicable to the transaction and can automatically apply the incentive or send a recommendation to the payment application 1118 for presentation via a user interface associated therewith. In addition to enabling a user to participate in a transaction during cart building, techniques described herein can enable a user to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the user, such as the user device 1108(A), to enable the user to complete the transaction via their own computing device. In some examples, in response to receiving an indication that the QR code, or other transaction code, has been captured or otherwise interacted with via the user computing device, the peer-to-peer payment platform can determine that the user authorizes payment of the transaction using funds associated with a stored balance of the user that is managed and/or maintained by the peer-to-peer payment platform. Such authorization can be implicit such that the interaction with the transaction code can imply authorization of the user. In some examples, in response to receiving an indication that the QR code, or other transaction code, has been captured or otherwise interacted with via the user computing device, the peer-to-peer payment platform can request authorization to process payment for the transaction using the funds associated with the stored balance and the user can interact with the payment application to authorize the settlement of the transaction. A response to such a request can provide an express authorization of the user. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the user, the peer-to-peer payment platform can transfer funds from the stored balance of the user to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the user in a peer-to-peer transaction.

In some examples, techniques described herein can enable the user to interact with the transaction after payment for the transaction has been settled. For example, in at least one example, the payment processing platform can cause a total amount of a transaction to be presented via a user interface associated with the payment application 1118 such that the user can provide gratuity, feedback, loyally information, or the like, via an interaction with the user interface. In some examples, because the user has already authorized payment via the peer-to-peer payment platform, if the user inputs a tip, the peer-to-peer payment platform can transfer additional funds, associated with the tip, to the payment processing platform. This pre-authorization (or maintained authorization) of sorts can enable faster, more efficient payment processing when the tip is received. Further, the user can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact with one another By moving aspects of a transaction that are traditionally performed on a computing device of a merchant to a computing device of a user, users can have more control over the transaction and can have more privacy. That is, users can monitor items that are added to their cart to ensure accuracy. Further, users can authorize payments, use rewards, claim incentives, add gratuity, or the like without being watched by the merchant or other users.

In some examples, such as when the QR code, or other transaction code, is captured by the computing device of the user prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a user adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a user can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the user computing device. For example, based at least in part on detecting a dip, tap, swipe, or the like, the payment processing platform can associate a user with a transaction and provide at least a portion of transaction data associated with the transaction to a user computing device associated therewith. In some examples, the payment instrument can be associated with the peer-to-peer payment platform as described herein (e.g., a debit card linked to a stored balance of a user) such that when the payment instrument is caused to interact with a payment reader, the payment processing platform can exchange communications with the peer-to-peer payment platform to authorize payment for a transaction and/or provision associated transaction data to a computing device of the user associated with the transaction.

Figure 14:
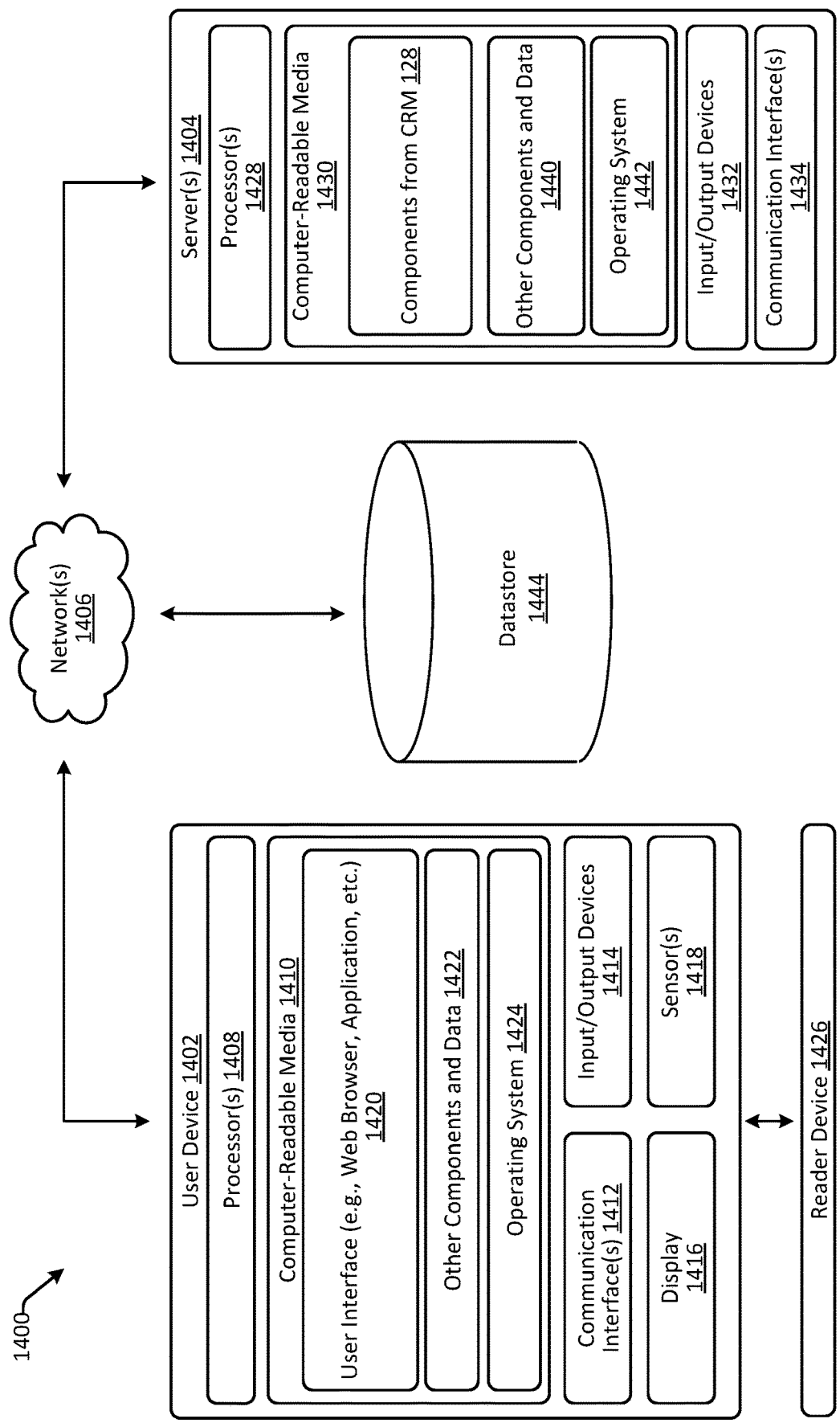
FIG. 14 is an illustrative block diagram illustrating a system for performing techniques described herein, according to an embodiment described herein.

FIG. 14 is an illustrative block diagram illustrating a system for performing techniques described herein, according to an embodiment described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 14.

The user device 1402 may be the same or similar to the primary user device 102 as described with respect to FIG. 1. Additionally, the server(s) 1404 may be the same or similar to the payment service 104 described with respect to FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be configured to display options for withdrawing funds to make donations. The user interface 1420 may also be configured to surface information about donations. It should be understood that the user interface 1420 can be configured to display, facilitate, or otherwise perform any of the interactions described herein with respect to multi-user transactions or other operations as described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction.

Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby users when they leave a geofence, or location can be used to initiate an action responsive to users 1414 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a user slides a card having a magnetic strip through a payment reader that captures payment data contained in the magnetic strip), a dip (i.e., a card-present transaction where a user inserts a card having an embedded microchip (i.e., chip) into a payment reader first until the payment reader prompts the user to remove the card), or a tap (i.e., a card-present transaction where a user may tap or hover his or her electronic device such as a smart phone running a payment application over a payment reader to complete a transaction via short-range communication) to obtain payment data associated with a user. Additionally or optionally, the reader device 1426 may also include a biometric sensor to receive and process biometric characteristics and process them as payment instruments, given that such biometric characteristics are registered with the payment service 104 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1412, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the user, an address of the user, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the user (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different users or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include the components from CRM 128 and one or more other components and data 1440.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, user profiles, and so on. In some examples, the datastore(s) 1444 can store user profiles of users, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, user service data, etc. The merchant profile can securely store bank account information as provided by the merchant. Further, the merchant profile can store payment information associated with a payment instrument linked to a stored balance of the merchant, such as a stored balance maintained in a ledger by the service provider.

User profiles can store user data including, but not limited to, user information (e.g., name, phone number, address, banking information, etc.), user preferences (e.g., learned or user-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, etc.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

EXAMPLE CLAUSES

1. A method implemented by at least one computing device of a service provider, the method comprising, comprising: receiving, in association with a first user profile, a request to initiate a transaction, wherein the transaction is associated with a time window for purchase of an item; during the time window: causing indicators of other user profiles that are associated with the first user profile to be presented via a user interface of a user device associated with the first user profile; receiving an indication of a selection of at least a second user profile from the indicators of the other user profiles; in response to receiving the indication of the selection, generating an interactive element embedded with data, wherein interaction with the interactive element: enables a user associated with the second user profile to indicate an intent to participate in the transaction with the first user profile by purchasing an additional item; and indicates the time window for purchase of the item; sending the interactive element to a user device associated with the second user profile; and receiving an indication of the intent to participate in the transaction by purchasing an additional item; and facilitating, prior to expiration of the time window, payment of the transaction using funds from at least one of an account associated with the first user profile, an account associated with the second user profile, or an account associated with the service provider.

2. The method as clause 1 recites, wherein the item is related to the additional item based at least in part on at least one of: the item being physically proximate to the additional item; the additional item being an instance of the item; the additional item being designated as similar to the item; or the item and the additional item being associated with a specific event.

3. The method as clause 1 and/or 2 recites, wherein facilitating the payment of the transaction includes: withdrawing the funds to purchase the item and the additional item from the account associated with the first user profile; causing the funds to be deposited into an account of a merchant that provides the item and the additional item; withdrawing a portion of the funds associated with the additional item from the account associated with the second user profile; and causing the portion of the funds to be deposited into the account associated with the first user profile.

4. The method as any of clauses 1, 2, and/or 3 recite, wherein facilitating the payment of the transaction includes: withdrawing the funds to purchase the item and the additional item from the account associated with the service provider; causing the funds to be deposited into an account of a merchant that provides the item and the additional item; withdrawing a first portion of the funds associated with the item from the account associated with the first user profile; withdrawing a second portion of the funds associated with the additional item from the account associated with the second user profile; and causing the first portion of the funds and the second portion of the funds to be deposited into the account associated with the service provider.

5. A system comprising: one or more processors; and non-transitory computer-readable media storing instructions that, when executed by the one or more processors, cause the system to perform operations comprising: receiving, in association with a first user profile, a request to initiate a transaction, wherein the transaction is associated with satisfaction of a condition for purchase of an item; causing indicators of other user profiles that are associated with the first user profile to be presented via a user interface of a user device associated with the first user profile; receiving an indication of a selection of at least a second user profile from the indicators of the other user profiles; in response to receiving the indication of the selection, generating an interactive element embedded with data, wherein interaction with the interactive element: enables a user associated with the second user profile to indicate an intent to participate in the transaction with the first user profile by purchasing an additional item; and indicates the condition to be satisfied for purchase of the item; sending the interactive element to a user device associated with the second user profile; receiving an indication of the intent to participate in the transaction by purchasing an additional item; and facilitating, prior to the condition being satisfied, payment of the transaction using funds from at least one of an account associated with the first user profile, an account associated with the second user profile, or an account associated with a service provider.

6. The system as clause 5 recites, wherein: the condition to be satisfied includes the transaction occurring prior to expiration of a time window; and receiving the indication of the intent to participate in the transaction occurs prior to the expiration of the time window.

7. The system as clause 5 and/or 6 recites, the operations further comprising: receiving a request to use an installment plan offered by the service provider for the payment of the transaction; and generating at least one installment plan for the first user profile and the second user profile, wherein at least one installment is paid using funds from the account associated with the first user profile and at least one installment is paid using funds from the account associated with the second user profile.

8. The system as any of clauses 5, 6, and/or 7 recite, the operations further comprising:
receiving a request to use an installment plan offered by the service provider for the payment of the transaction; and generating at least one installment plan for the first user profile and the second user profile, wherein a first portion of at least one installment is paid using funds from the account associated with the first user profile and a second portion of the at least one installment is paid using funds from the account associated with the second user profile.

9. The system as any of clauses 5, 6, 7, and/or 8 recite, the operations further comprising: receiving a request to use an installment plan offered by the service provider for the payment of the transaction; selecting the installment plan from multiple potential installment plans based at least in part on first user data associated with the first user profile and second user data associated with the second user profile; and causing display of an indicator of the installment plan as an option for satisfying the payment of the transaction.

10. The system as any of clauses 5, 6, 7, 8, and/or 9 recite, the operations further comprising: receiving a request to use an installment plan offered by the service provider for the payment of the transaction; selecting a first installment plan of multiple potential installment plans to provide as a first payment option to the first user profile based at least in part on first user data associated with the first user profile; and selecting a second installment plan of the multiple potential installment plans to provide as a second payment option to the second user profile based at least in part on second user data associated with the second user profile, wherein the first installment plan differs from the second installment plan.

11. The system as any of clauses 5, 6, 7, 8, 9, and/or 10 recite, wherein the interactive element comprises a first interactive element, and the operations further comprise: receiving a selection of a third user profile; and generating a second interactive element embedded with the data, the second interactive element including information specific to the third user profile and another item to be purchased in association with the item, wherein the first interactive element includes information specific to the second user profile and the additional item.

12. The system as any of clauses 5, 6, 7, 8, 9, 10, and/or 11 recite, the operations further comprising: causing, based at least in part on receiving the request and prior to receiving the indication of the intent to participate in the transaction, the user interface to display an indication that the transaction is pending opt in from the at least the second user profile; and causing, based at least in part on receiving the indication of the intent to participate in the transaction, the user interface to be updated to display an indication that at least the second user profile has opted into the transaction and a payment portion of the transaction is to occur.

13. A computer-implemented method comprising: receiving, in association with a first user profile, a request to initiate a transaction, wherein the transaction is associated with satisfaction of a condition for purchase of an item; causing indicators of other user profiles to be presented via a user interface of a user device associated with the first user profile; receiving input data indicating a selection of a second user profile from the indicators of the other user profiles; based at least in part on the input data, generating an interactive element embedded with data, wherein interaction with the interactive element enables a user associated with the second user profile to participate in the transaction by purchasing at least one of an additional item or a portion of the item; sending the interactive element to a user device associated with the second user profile; receiving an indication that the user has requested to participate in the transaction; and facilitating, prior to the condition being satisfied, payment of the transaction using funds from at least one of an account associated with the first user profile, an account associated with the second user profile, or an account associated with a service provider.

14. The computer-implemented method as clause 13 recites, wherein the purchasing is for a portion of the item, the computer-implemented method further comprising: determining, based at least in part on characteristics of the item, that a first portion of the item to be associated with the first user profile is similar to a second portion of the item to be associated with the second user profile; and wherein the interactive element indicates that the second user profile is to be associated with the second portion of the item when the user requests to participate in the transaction.

15. The computer-implemented method as clause 13 and/or 14 recites, further comprising: determining, based at least in part on characteristics of the item, that the item is be associated with the first user profile and the additional item is to be associated with the second user profile, wherein the item and the additional item are associated with a specific event; and wherein the interactive element indicates that the second user profile is to be associated with the additional item when the user requests to participate in the transaction.

16. The computer-implemented method as any of clauses 13, 14, and/or 15 recite, further comprising: receiving a request to use an installment plan offered by the service provider for the payment of the transaction; and generating at least one installment plan for the first user profile and the second user profile, wherein a first portion of at least one installment is paid using funds from the account associated with the first user profile and a second portion of the at least one installment is paid using funds from the account associated with the second user profile.

17. The computer-implemented method as any of clauses 13, 14, 15, and/or 16 recites, further comprising: receiving a request to use an installment plan offered by the service provider for the payment of the transaction; and selecting the installment plan from multiple potential installment plans based at least in part on first user data associated with the first user profile and second user data associated with the second user profile.

18. The computer-implemented method as any of clauses 13, 14, 15, 16, and/or 17 recite, further comprising: receiving a request to use an installment plan offered by the service provider for the payment of the transaction; selecting a first installment plan of multiple potential installment plans to provide as a first payment option to the first user profile based at least in part on first user data associated with the first user profile; and selecting a second installment plan of the multiple potential installment plans to provide as a second payment option to the second user profile based at least in part on second user data associated with the second user profile, wherein the first installment plan differs from the second installment plan.

19. The computer-implemented method as any of clauses 13, 14, 15, 16, 17, and/or 18 recite, wherein the item is related to the additional item based at least in part on at least one of: the item being physically proximate to the additional item; the additional item being an instance of the item; the additional item being designated as similar to the item; or the item and the additional item being associated with a specific event.

20. The computer-implemented method as any of clauses 13, 14, 15, 16, 17, 18, and/or 19 recite, wherein: the condition to be satisfied includes the transaction occurring prior to expiration of a time window; and receiving the indication of that the user has requested to participate in the transaction occurs prior to the expiration of the time window.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 4A-4C and 6A-9 for convenience and ease of understanding. However, the methods illustrated are not limited to being performed using components described in FIGS. 1-3, 5, and 10-14 and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method implemented by at least one computing device of a service provider, the method comprising:
   receiving, by the at least one computing device via a first user interface associated with a first user profile, a request to initiate a transaction, wherein the transaction is associated with a time period for purchase of a first item;
   during the time period:
      identifying the transaction as a potential multi-user transaction;
      causing, by the at least one computing device, indicators of other user profiles that are associated with the first user profile to be presented via the first user interface;
      receiving by the at least one computing device, and via the first user interface, an indication of a selection of at least a second user profile from the indicators of the other user profiles;
      in response to receiving the indication of the selection, generating, by the at least one computing device, a dynamic user-specific interactive element embedded with data, wherein interaction with the dynamic user-specific interactive element causes display of, via a second user interface, an indication of a second item offered for purchase exclusively to a user associated with the second user profile and an indication based on time remaining in the time period;
      sending, by the at least one computing device, the dynamic user-specific interactive element to a user device associated with the second user profile; and
      receiving, by the at least one computing device, an indication of an intent to participate in the transaction by purchasing the second item;
   querying, by the at least one computing device, an account associated with the first user profile to determine whether sufficient funds are available for a payment of the first item;
   querying, by the at least one computing device, an account associated with the second user profile to determine whether sufficient funds are available for a payment of the second item; and
   in response to determining sufficient funds are available for each payment, facilitating, by the at least one computing device and at a time prior to expiration of the time period, payment of the transaction, wherein facilitating the payment causes first funds for a cost of the first item to be withdrawn from the account associated with the first user profile for payment of the first item and second funds for a cost of the second item to be withdrawn from the account associated with the second user profile for payment of the second item, and depositing the first funds and the second funds in an account associated with a merchant that provides the first item and the second item, and wherein the account associated with the first user profile and the account associated with the second user profile are maintained by the service provider.

2. The method as claim 1 recites, wherein identifying the transaction as the potential multi-user transaction is based at least in part on one or more of whether:
   the transaction includes multiple items or an item with multiple portions,
   the first user profile, a merchant profile of the merchant that provides the first item and the second item, or characteristics of the first item.

3. The method as claim 1 recites, wherein identifying the transaction as the potential multi-user transaction further comprises:
   using a machine learning model trained using feedback data indicating whether a social purchasing option was selected for a social purchase in previous transactions, wherein causing the indicators of the other user profiles is based at least in part on identifying the transaction as the potential multi-user transaction.

4. The method as claim 1 recites, wherein the dynamic user-specific interactive element is further configured to display an indication of an option to pay via a user-specific payment installment plan, wherein interaction with the dynamic user-specific interactive element comprises a request by the user associated with the second user profile to pay via the user-specific payment installment plan, wherein the querying the account associated with the second user profile comprises determining eligibility of the user for the user-specific payment installment plan and determining that funds for a first installment comprising partial payment of the second item are available, and wherein determining that sufficient funds are available for the payment of the second item comprises determining that sufficient funds for the first installment are available.

5. The method as claim 1 recites, wherein the dynamic user-specific interactive element is further configured to display an indication of an option to pay via an installment plan.

6. A system comprising:
   one or more processors; and
   non-transitory computer-readable media storing instructions that, when executed by the one or more processors, cause the system to perform operations comprising:
      receiving, by at least one computing device via a first user interface associated with a first user profile, a request to initiate a transaction, wherein the transaction is associated with a time period for purchase of a first item;
      during the time period:
         identifying the transaction as a potential multi-user transaction;
         causing, by the at least one computing device, indicators of other user profiles that are associated with the first user profile to be presented via the first user interface;
         receiving by the at least one computing device, and via the first user interface, an indication of a selection of at least a second user profile from the indicators of the other user profiles;
         in response to receiving the indication of the selection of at least the second user profile, generating, by the at least one computing device, a dynamic user-specific interactive element embedded with data, wherein interaction with the dynamic user-specific interactive element causes display of, via a second user interface, an indication of a second item offered for purchase exclusively to a user associated with the second user profile and an indication based on time remaining in the time period;
         sending, by the at least one computing device, the dynamic user-specific interactive element to a user device associated with the second user profile; and
         receiving, by the at least one computing device, an indication of an intent to participate in the transaction by purchasing the second item;
      querying, by the at least one computing device, an account associated with the first user profile to determine whether sufficient funds are available for payment of the first item;
      querying, by the at least one computing device, an account associated with the second user profile to determine whether sufficient funds are available for payment of the second item; and
      in response to determining sufficient funds are available for each payment, facilitating, by the at least one computing device and at a time prior to expiration of the time period the, payment of the transaction, wherein facilitating the payment causes first funds for a cost of the first item to be withdrawn from the account associated with the first user profile for payment of the first item and second funds for a cost of the second item to be withdrawn from the account associated with the second user profile for payment of the second item, and depositing the first funds and the second funds in an account associated with a merchant that provides the first item and the second item, an wherein the account associated with the first user profile and the account associated with the second user profile are maintained by a service provider.

7. The system as claim 6 recites, the operations further comprising:
   in response to determining sufficient funds are not available for each payment:
   receiving a request to use an installment plan offered by the service provider for the payment of the transaction; and
   generating at least one installment plan for the first user profile and the second user profile, wherein at least one installment is paid using funds from the account associated with the first user profile and at least one installment is paid using funds from the account associated with the second user profile.

8. The system as claim 6 recites, the operations further comprising:
   in response to determining sufficient funds are not available for each payment:
   receiving a request to use an installment plan offered by the service provider for the payment of the transaction;
   selecting the installment plan from multiple potential installment plans based at least in part on first user data associated with the first user profile and second user data associated with the second user profile; and
   causing display of an indicator of the installment plan as an option for satisfying the payment of the transaction.

9. The system as claim 6 recites, wherein the dynamic user-specific interactive element comprises a first dynamic user-specific interactive element, and the operations further comprise:

receiving a selection of a third user profile; and generating a second dynamic user-specific interactive element embedded with the data, wherein interaction with the second dynamic user-specific interactive element causes display of information specific to the third user profile and a third item, offered exclusively to a user associated with the third user profile, to be purchased in association with the first item, wherein the first dynamic user-specific interactive element includes information specific to the second user profile and the second item.

10. The system as claim 6 recites, the operations further comprising:

causing, based at least in part on receiving the request to initiate the transaction and prior to receiving the indication of the intent to participate in the transaction, the first user interface to display an indication that the transaction is pending opt in from the at least the second user profile; and causing, based at least in part on receiving the indication of the intent to participate in the transaction, the first user interface to be updated to display an indication that at least the second user profile has opted into the transaction and a payment portion of the transaction is to occur.

11. The system as claim 6 recites, wherein the dynamic user-specific interactive element is a first dynamic user-specific interactive element, and further comprising:

in response to determining sufficient funds are not available for each payment:

receiving, by the at least one computing device, a request to use one of a number of installment plans offered by the service provider for the payment of the transaction;

generating, by the at least one computing device, a second dynamic user-specific interactive element embedded with data, wherein interaction with the second dynamic user-specific interactive element causes display of, via a third user interface, an indication of a number of installments, an amount of each installment, and a total amount based at least in part on the number of installments; and receiving, by the at least one computing device, an indication of a selection of an installment plan.

12. The system as claim 6 recites, wherein the dynamic user-specific interactive element is further configured to display an indication of an option to pay via an installment plan.

13. The system as claim 6 recites, wherein identifying the transaction as the potential multi-user transaction is based at least in part on one or more of whether:

the transaction includes multiple items or an item with multiple portions, the first user profile, a merchant profile of the merchant that provides the first item and the second item, or characteristics of the first item.

14. The system as claim 6 recites, wherein identifying the transaction as the potential multi-user transaction further comprises using a machine learning model trained using feedback data indicating whether a social purchasing option was selected in previous transactions, wherein causing the indication of the other user profiles is based at least in part on identifying the transaction as the potential multi-user transaction.

15. One or more non-transitory computer-readable media storing instructions that, when executed, cause one or more processors to perform operations comprising:

receiving, by at least one computing device via a first user interface associated with a first user profile, a request to initiate a transaction, wherein the transaction is associated with a time period for purchase of a first item;

during the time period:

identifying the transaction as a potential multi-user transaction;

causing, by the at least one computing device, indicators of other user profiles that are associated with the first user profile to be presented via the first user interface;

receiving, by the at least one computing device, and via the first user interface, input data indicating a selection of a second user profile from the indicators of the other user profiles;

based at least in part on the input data, generating, by the at least one computing device, a user-specific interactive element embedded with data, wherein interaction with the user-specific interactive element causes display of, via a second user interface, an indication of at least one of a second item or a portion of the first item offered for purchase exclusively to a user associated with the second user profile and an indication based on time remaining in the time period;

sending, by the at least one computing device, the user-specific interactive element to a user device associated with the second user profile; and receiving, by the at least one computing device, an indication that the user has requested to participate in the transaction;

querying, by the at least one computing device, an account associated with the first user profile to determine whether sufficient funds are available for a payment of the first item;

querying, by the at least one computing device, an account associated with the second user profile to determine whether sufficient funds are available for a payment of the second item or the portion of the first item; and in response to determining sufficient funds are available for each payment, facilitating, by the at least one computing device and at a time prior to expiration of the time period, payment of the transaction, wherein facilitating the payment causes first funds for a cost of the first item to be withdrawn from the account associated with the first user profile for payment of the first item and second funds for a cost of the second item to be withdrawn from the account associated with the second user profile for payment of the second item or the portion of the first item, and depositing the first funds and the second funds in an account associated with a merchant that provides the first item and the second item and wherein the account associated with the first user profile and the account associated with the second user profile are maintained by a service provider.

16. The one or more non-transitory computer-readable media as claim 15 recites, wherein the purchasing is for the portion of the first item, the operations further comprising:

determining, based at least in part on characteristics of the first item, that a first portion of the first item to be associated with the first user profile is similar to a second portion of the first item to be associated with the second user profile; and wherein the user-specific interactive element indicates that the second user profile is to be associated with the second portion of the first item when the user requests to participate in the transaction.

17. The one or more non-transitory computer-readable media as claim 15 recites, wherein the purchasing is for the second item, the operations further comprising:
determining, based at least in part on characteristics of the first item, that the first item is be associated with the first user profile and the second item is to be associated with the second user profile, wherein the first item and the second item are associated with a specific event; and
wherein the user-specific interactive element indicates that the second user profile is to be associated with the second item when the user requests to participate in the transaction.

18. The one or more non-transitory computer-readable media as claim 15 recites, the operations further comprising:
in response to determining sufficient funds are not available for each payment:
receiving a request to use an installment plan offered by the service provider for the payment of the transaction; and
selecting the installment plan from multiple potential installment plans based at least in part on first user data associated with the first user profile and second user data associated with the second user profile.

19. The one or more non-transitory computer-readable media as claim 15 recites, the operations further comprising:
in response to determining sufficient funds are not available for each payment:
receiving a request to use an installment plan offered by the service provider for the payment of the transaction;
selecting a first installment plan of multiple potential installment plans to provide as a first payment option to the first user profile based at least in part on first user data associated with the first user profile; and
selecting a second installment plan of the multiple potential installment plans to provide as a second payment option to the second user profile based at least in part on second user data associated with the second user profile, wherein the first installment plan differs from the second installment plan.

20. The one or more non-transitory computer-readable media as claim 15 recites, wherein the purchasing is for the second item, and wherein the first item is related to the second item based at least in part on at least one of:
the first item being physically proximate to the second item;
the second item being an instance of the first item;
the second item being designated as similar to the first item; or
the first item and the second item being associated with a specific event.

* * * * *